United States Patent
Ji et al.

(10) Patent No.: US 8,611,331 B2
(45) Date of Patent: Dec. 17, 2013

(54) TIME DIVISION DUPLEXING (TDD) CONFIGURATION FOR ACCESS POINT BASE STATIONS

(75) Inventors: Tingfang Ji, San Diego, CA (US); Ravi Palanki, San Diego, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 12/712,820

(22) Filed: Feb. 25, 2010

(65) Prior Publication Data

US 2010/0220597 A1   Sep. 2, 2010

Related U.S. Application Data

(60) Provisional application No. 61/156,334, filed on Feb. 27, 2009, provisional application No. 61/156,760, filed on Mar. 2, 2009.

(51) Int. Cl.
*H04J 3/06* (2006.01)
*H04W 4/00* (2009.01)
*H04J 3/00* (2006.01)
*H04B 7/212* (2006.01)

(52) U.S. Cl.
USPC ........... 370/350; 370/329; 370/336; 370/347; 370/442

(58) Field of Classification Search
USPC .................. 370/328, 329, 336, 347, 350, 442
See application file for complete search history.

(56) References Cited

U.S. PATENT DOCUMENTS

| | | | |
|---|---|---|---|
| 5,914,946 A * | 6/1999 | Avidor et al. | 370/336 |
| 6,912,022 B2 | 6/2005 | Lin et al. | |
| 7,172,915 B2 | 2/2007 | Lin et al. | |
| 7,460,291 B2 | 12/2008 | Sampsell et al. | |
| 8,134,938 B2 * | 3/2012 | Yi et al. | 370/255 |
| 2004/0162083 A1 * | 8/2004 | Chen et al. | 455/454 |

(Continued)

FOREIGN PATENT DOCUMENTS

| | | | |
|---|---|---|---|
| EP | 0841827 A2 | 5/1998 | |
| GB | 2367455 | 4/2002 | |
| WO | WO2005062798 A2 | 7/2005 | |
| WO | WO2008103090 * | 8/2008 | H04B 7/26 |

OTHER PUBLICATIONS

Written Opinion—PCT/US2010/025655—International Search Authority, European Patent Office—Jun. 7, 2010.

(Continued)

*Primary Examiner* — Ronald Abelson
(74) *Attorney, Agent, or Firm* — Anthony R. Morris

(57) ABSTRACT

Systems and methodologies are described that facilitate establishing synchronization and/or mitigating interference with a time division duplexing (TDD) access point base station in a wireless communication environment. For example, a TDD configuration can be selected for the access point base station based upon received information to control interference. By way of another example, the access point base station can be synchronized with a disparate base station based upon the received information. Moreover, the received information can relate to the disparate base station, a served user equipment (UE) (e.g., served by the access point base station, . . . ), and/or a non-served UE (e.g., served by a base station other than the access point base station, . . . ). For example, the served UE can transmit a measurement related to the disparate base station to the access point base station.

59 Claims, 14 Drawing Sheets

(56) References Cited

U.S. PATENT DOCUMENTS

| | | |
|---|---|---|
| 2004/0209195 A1 | 10/2004 | Lin |
| 2004/0227667 A1* | 11/2004 | Sievenpiper ........... 343/700 MS |
| 2007/0042784 A1 | 2/2007 | Anderson et al. |
| 2008/0009256 A1 | 1/2008 | Anderson |
| 2008/0267063 A1 | 10/2008 | Trigui et al. |
| 2010/0054237 A1* | 3/2010 | Han et al. ...................... 370/350 |

OTHER PUBLICATIONS

International search report—PCT/US2010/025655, International Search Authority—European Patent Office—Jun. 7, 2010.

Taiwan Search Report—TW099105713—TIPO—Apr. 1, 2013.

* cited by examiner

TIME DIVISION DUPLEXING (TDD) CONFIGURATION FOR ACCESS POINT BASE STATIONS

CLAIM OF PRIORITY UNDER 35 U.S.C. §119

The present Application for patent claims priority to Provisional Application No. 61/156,334 entitled "TIME DIVISION DUPLEXING (TDD) CONFIGURATION FOR ACCESS POINT BASE STATIONS" filed Feb. 27, 2009; and Provisional Application No. 61/156,760 entitled "TIME DIVISION DUPLEXING (TDD) CONFIGURATION FOR ACCESS POINT BASE STATIONS" filed Mar. 2, 2009. The aforementioned Provisional Applications are assigned to the assignee hereof and hereby expressly incorporated by reference herein.

BACKGROUND

1. Field

The following description relates generally to wireless communications, and more particularly to establishing synchronization and/or mitigating interference with a time division duplexing (TDD) access point base station in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, ... ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO) systems, multiple-input multiple-output (MIMO) systems, and so forth. In addition, UEs can communicate with other UEs (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The access point base station is another class of base station that has recently emerged. Access point base stations are commonly designed for residential or small business environments, and can provide wireless coverage to UEs using a wireless technology (e.g., 3GPP Universal Mobile Telecommunications System (UMTS) or LTE, 1×Evolution-Data Optimized (1×EV-DO), ... ) to communicate with the UEs and an existing broadband Internet connection (e.g., digital subscriber line (DSL), cable, ... ) for backhaul. An access point base station can also be referred to as a Home Evolved Node B (HeNB), a Home Node B (HNB), a femto cell, a femto cell base station, or the like. Examples of other types of base stations include pico cell base stations, micro cell base stations, and so forth.

According to an example, an access point base station can implement time division duplexing (TDD). The access point base station employing TDD can transmit (e.g., via a downlink, ... ) and receive (e.g., via an uplink, ... ) using a common frequency band at different times. Moreover, disparate base station(s) (e.g., disparate access point base station(s), disparate macro cell base station(s), any disparate type of base station(s), ... ) positioned nearby to the access point base station can similarly use the common frequency band to transmit (e.g., over the downlink, ... ) and receive (e.g., over the uplink, ... ). However, if the access point base station lacks synchronization with the disparate base station(s) positioned nearby (or a subset thereof), then interference can result. For instance, if the access point base station and a neighboring macro cell base station are unsynchronized in time, then the access point base station can transmit while the neighboring macro cell base station is receiving, or vice versa. Hence, significant interference due to downlink/uplink jamming can be experienced under such a scenario where the access point base station lacks synchronization with disparate base station(s) located within vicinity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating establishing of synchronization and/or mitigating of interference with a time division duplexing (TDD) access point base station in a wireless communication environment. For example, a TDD configuration can be selected for the access point base station based upon received information to control interference. By way of another example, the access point base station can be synchronized with a disparate base station based upon the received information. Moreover, the received information can relate to the disparate base station, a served user equipment (UE) (e.g., served by the access point base station, ... ), and/or a non-served UE (e.g., served by a base station other than the access point base station, ... ). For example, the served UE can transmit a measurement related to the disparate base station to the access point base station.

According to related aspects, a method is described herein. The method can include receiving information related to at least one of a disparate base station, a served user equipment (UE), or a non-served UE at an access point base station in a time division duplexing (TDD) wireless communication environment. Further, the method can include selecting a TDD configuration for the access point base station based upon the information to control interference in the TDD wireless communication environment.

Another aspect relates to a wireless communications apparatus. The wireless communications apparatus can include at least one processor. The at least one processor can be configured to receive information related to at least one of a disparate base station, a served user equipment (UE), or a non-served UE at an access point base station in a time division duplexing (TDD) wireless communication environment. Moreover, the at least one processor can be configured to select a TDD configuration for the access point base station based upon the information to control interference in the TDD wireless communication environment.

Yet another aspect relates to an apparatus. The apparatus can include means for receiving information related to at least one of a disparate base station, a served user equipment (UE), or a non-served UE at an access point base station in a time division duplexing (TDD) wireless communication environment. Further, the apparatus can include means for selecting a TDD configuration for the access point base station based upon the information to control interference in the TDD wireless communication environment.

Still another aspect relates to a computer program product that can comprise a computer-readable medium. The computer-readable medium can include code for causing at least one computer to receive information related to at least one of a disparate base station, a served user equipment (UE), or a non-served UE at an access point base station in a time division duplexing (TDD) wireless communication environment. Further, the computer-readable medium can include code for causing at least one computer to select a TDD configuration for the access point base station based upon the information to control interference in the TDD wireless communication environment.

Yet another aspect relates to an apparatus that can include a timing component that maintains timing for an access point base station. Moreover, the apparatus can include a synchronization component that implements network listening at the access point base station to self-synchronize the access point base station with a disparate base station by adjusting the timing maintained by the timing component.

In accordance with other aspects, a method is described herein. The method can include monitoring a non-serving base station at a user equipment (UE) in a time division duplexing (TDD) wireless communication environment. Moreover, the method can include transmitting a measurement related to the non-serving base station to an access point base station that serves the UE, the measurement utilized to one or more of synchronize the access point base station or select a TDD configuration for the access point base station.

Another aspect relates to a wireless communications apparatus. The wireless communications apparatus can include at least one processor. The at least one processor can be configured to monitor a non-serving base station at a user equipment (UE) in a time division duplexing (TDD) wireless communication environment. Further, the at least one processor can be configured to transmit a measurement related to the non-serving base station to an access point base station that serves the UE, the measurement utilized to one or more of synchronize the access point base station or select a TDD configuration for the access point base station.

Yet another aspect relates to an apparatus. The apparatus can include means for monitoring a non-serving base station at a user equipment (UE) in a time division duplexing (TDD) wireless communication environment. Further, the apparatus can include means for transmitting a measurement related to the non-serving base station to an access point base station that serves the UE, the measurement utilized to one or more of synchronize the access point base station or select a TDD configuration for the access point base station.

Still another aspect relates to a computer program product that can comprise a computer-readable medium. The computer-readable medium can include code for causing at least one computer to monitor a non-serving base station at a user equipment (UE) in a time division duplexing (TDD) wireless communication environment. Moreover, the computer-readable medium can include code for causing at least one computer to transmit a measurement related to the non-serving base station to an access point base station that serves the UE, the measurement utilized to one or more of synchronize the access point base station or select a TDD configuration for the access point base station.

Yet another aspect relates to an apparatus that can include a monitor component that detects a timing difference between an access point base station that serves a user equipment (UE) and a disparate base station in a time division duplexing (TDD) wireless communication environment. Moreover, the apparatus can include an adjustment feedback component that identifies a timing adjustment for the access point base station based upon the timing difference and sends the timing adjustment to the access point base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
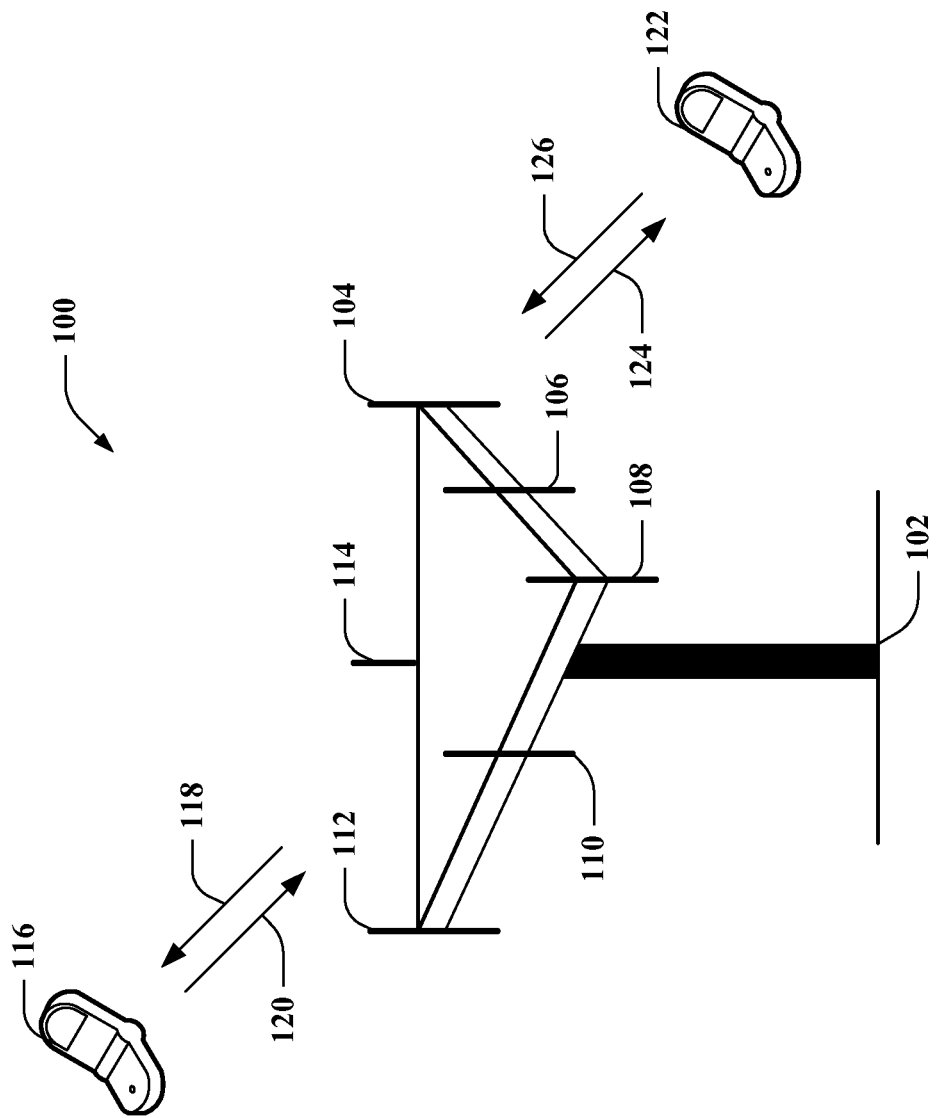
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. Wireless communication system 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UEs 116 and 122. UEs 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UEs 116 and 122. Also, while base station 102 utilizes beamforming to transmit to UEs 116 and 122 scattered randomly through an associated coverage, UEs in neighboring cells can be subject to less interference as compared to a base station transmitting through a single antenna to all its UEs.

It is contemplated that base station 102 can be any type of base station (e.g., access point base station, macro cell base station, micro cell base station, pico cell base station, relay base station, . . . ). Further, base station 102 can operate in closed access mode, for example. When employing closed access mode, base station 102 can operate as a closed subscriber group (CSG) base station where a select group of users identified by a CSG Identifier (ID) are allowed to access such base station. It is to be appreciated, however, that the claimed subject matter is not so limited (e.g., base station 102 can operate in hybrid access mode, open access mode, . . . ).

A CSG base station refers to a base station with restricted association accessible by members of a CSG (e.g., non-accessible by non-members of the CSG, . . . ). A CSG base station can also be referred to as a closed base station. A CSG is a set of base stations that share a common access control list of UEs. Further, a CSG base station can advertise a corresponding CSG ID (e.g., CSG identity, . . . ), which specifies the CSG corresponding to the CSG base station.

For example, base station 102 can be a CSG access point base station, which can be accessible by members of an associated CSG and non-accessible by non-members of the CSG. A UE (e.g., UE 116, UE 122, . . . ) can be positioned close to the CSG access point base station (e.g., the UE can be nearby the CSG access point base station located in a neighbor's house, . . . ), yet the UE can be a non-member of the associated CSG. Thus, the UE can be unable to access the CSG access point base station, which can result in various issues. For instance, if the UE is attempting to receive a signal from a macro cell base station (not shown) while located nearby the non-accessible CSG access point base station, a downlink transmission from the CSG access point base station, although at low power, can be overwhelming, thereby causing strong interference on the downlink. By way of further illustration, if the UE tries to transmit a signal to the macro cell base station while positioned within proximity of the non-accessible CSG access point base station, the UE can transmit at high power, which can cause high interference to the CSG access point base station on the uplink. To address the foregoing issues associated with access point base stations, synchronization (e.g., in time, . . . ) between base stations (e.g., access point base station(s), disparate base station(s), . . . ) can be leveraged. Synchronization can be implemented to avoid downlink/uplink jamming. Further, upon the base stations being synchronized, configuration, timing, scheduling, etc. among the base stations can be coordinated. However, it is also to be appreciated that an access point base station can operate asynchronously.

Moreover, system 100 can be a TDD system. Thus, base station 102 can transmit and receive using a common frequency band. Yet, if base station 102 (e.g., access point base station, . . . ) is not synchronized with disparate base station(s), base station 102 can transmit while a detrimentally impacted base station (not shown) is concurrently receiving. Similarly, base station 102 (e.g., access point base station, . . . ) can be detrimentally impacted if not synchronized with disparate base station(s) since base station 102 can receive while an interfering base station (not shown) is concurrently transmitting. Further, UEs (e.g., UE 116, UE 122, disparate UE(s) (not shown), . . . ) can jam each other (e.g., a first UE can transmit when a second UE can receive, . . . ). Such jamming of UEs can result from a serving base station (e.g., access point base station, . . . ) of a first UE being out of sync with a serving base station (e.g., macro cell base station, . . . ) of a second UE. The aforementioned situations can be referred to as downlink/uplink jamming, which can be caused by out of sync base stations. According to an example, system 100 can synchronize access point base station(s) and disparate base station(s) in a TDD deployment. By way of another example, system 100 can reduce interference to mitigate an impact caused by downlink/uplink jamming, which can result from base station to base station jamming (e.g., access point base station to a disparate base station jamming, . . . ) or UE to UE jamming. Conventional techniques typically fail to handle interference caused by downlink/uplink jamming. In contrast, system 100 can effectuate controlling interference resulting from downlink/uplink jamming in combination with synchronizing base stations, for example. Pursuant to another example, it is to be appreciated that system 100 can implement managing interference resulting from downlink/uplink jamming while base station(s) (e.g., access point base station(s), . . ) operate asynchronously.

Figure 2:
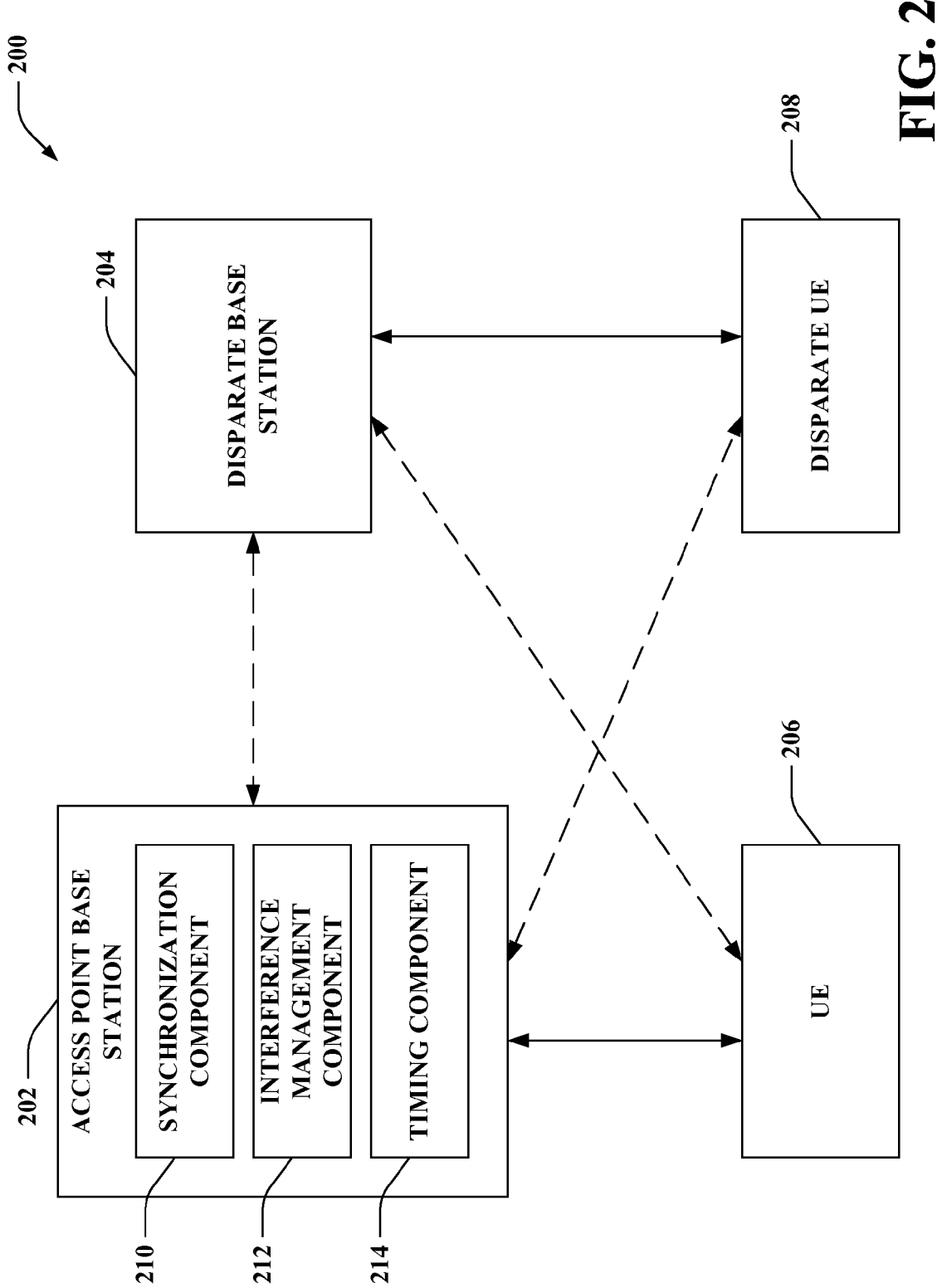
FIG. 2 is an illustration of an example system that supports establishing synchronization and/or managing interference in a TDD wireless communication environment.

Referring to FIG. 2, illustrated is a system 200 that supports establishing synchronization and/or managing interference in a TDD wireless communication environment. System 200 includes an access point base station 202 that can transmit and/or receive information, signals, data, instructions, commands, bits, symbols, and the like. Moreover, system 200 can include a disparate base station 204, which can transmit and/or receive information, signals, data, instructions, commands, bits, symbols, and the like. Access point base station 202 and disparate base station 204 can be located within proximity of each other, for instance (e.g., access point base station 202 and disparate base station 204 can be neighboring base stations, . . . ). Access point base station 202 can communicate with a UE 206 via the forward link and/or reverse link. UE 206 can transmit and/or receive information, signals, data, instructions, commands, bits, symbols, and the like. Further, disparate base station 204 can communicate with a disparate UE 208 via the forward link and/or reverse link. Disparate UE 208 can transmit and/or receive information, signals, data, instructions, commands, bits, symbols, and the like. Moreover, although not shown, it is contemplated that any number of access point base stations similar to access point base station 202 and/or any number of disparate base stations similar to disparate base station 204 can be included in system 200. It is also to be appreciated that system 200 can include any number of UEs similar to UE 206 and/or disparate UE 208. Further, it is contemplated that disparate base station 204 can be any type of base station (e.g., access point base station, pico cell base station, micro cell base station, macro cell base station, relay base station, . . . ).

According to an example, it is contemplated that access point base station 202 and disparate base station 204 can communicate via a backhaul; yet, the claimed subject matter is not so limited. By way of another example, it is to be appreciated that UE 206 can be served by access point base station 202. Following this example, while being served by access point base station 202, UE 206 can receive signals sent from disparate base station 204 and/or transmit signals that can be received by disparate base station 204. In accordance with a further example, disparate base station 204 can serve disparate UE 208, and disparate UE 208 can receive signals sent from access point base station 202 and/or transmit signals that can be received by access point base station 202.

Access point base station 202 can coordinate configuration, timing, scheduling, and the like with disparate base station 204 (and/or any number of other base station(s) (not shown)) to control interference due to downlink/uplink jamming Pursuant to an illustration, if access point base station 202 and disparate base station 204 are unsynchronized in a TDD deployment, then access point base station 202 can transmit (e.g., transmit a signal to UE 206 over the downlink, . . . ) concurrently while disparate base station 204 attempts to receive (e.g., receive a signal from disparate UE 208 over the uplink, . . . ). Similarly, if unsynchronized, access point base station 202 can attempt to receive (e.g., receive a signal from UE 206 over the uplink, . . . ) concurrently while disparate base station 204 transmits (e.g., transmits a signal to disparate UE 208 over the downlink, . . . ). By way of further illustration, if access point base station 202 and disparate base station 204 are unsynchronized in a TDD deployment, then UE 206 can transmit (e.g., transmit a signal to access point base station 202 over the uplink, . . . ) concurrently while disparate UE 208 attempts to receive (e.g., receive a signal from disparate base station 204 over the downlink, . . . ) and/or UE 206 can attempt to receive (e.g., receive a signal from access point base station 202 over the downlink, . . . ) concurrently while disparate UE 208 transmits (e.g., transmits a signal to disparate base station 204 over the uplink, . . . ). The aforementioned illustrations depict examples of downlink/uplink jamming that can yield interference, which can be mitigated within system 200.

Access point base station 202 can include a synchronization component 210, an interference management component 212, and a timing component 214. Synchronization component 210 can enable access point base station 202 to synchronize operation with disparate base station 204 (and/or any other base station(s)). For example, synchronization component 210 can implement network listening at access point base station 202 to self-synchronize access point base station 202 with disparate base station 204 (e.g., a macro cell base station, . . . ). Further, synchronization component 210 can adjust timing (e.g., a clock, . . . ) of access point base station 202 maintained by timing component 214. According to an example, synchronization component 210 can recognize that the timing maintained by timing component 214 is misaligned with timing of disparate base station 204, and based thereupon, synchronization component 210 can alter the timing maintained by timing component 214.

Moreover, interference management component 212 can implement various techniques to control interference. By way of illustration, interference management component 212 can select a TDD configuration to be utilized by access point base station 202 to control interference; however, it is contemplated that the claimed subject matter is not so limited. For example, interference management component 212 can mitigate interference regardless whether or not access point base station 202 synchronizes with disparate base station 204 (and/or any other base station(s)). Following this example, interference management component 212 can implement different approaches when access point base station 202 operates synchronously versus when access point base station 202 operates asynchronously; yet, it is to be appreciated that some approaches can be utilized regardless whether access point base station 202 operates synchronously or asynchronously. Techniques leveraged by interference management component 212 are described in more detail herein.

Figure 3:
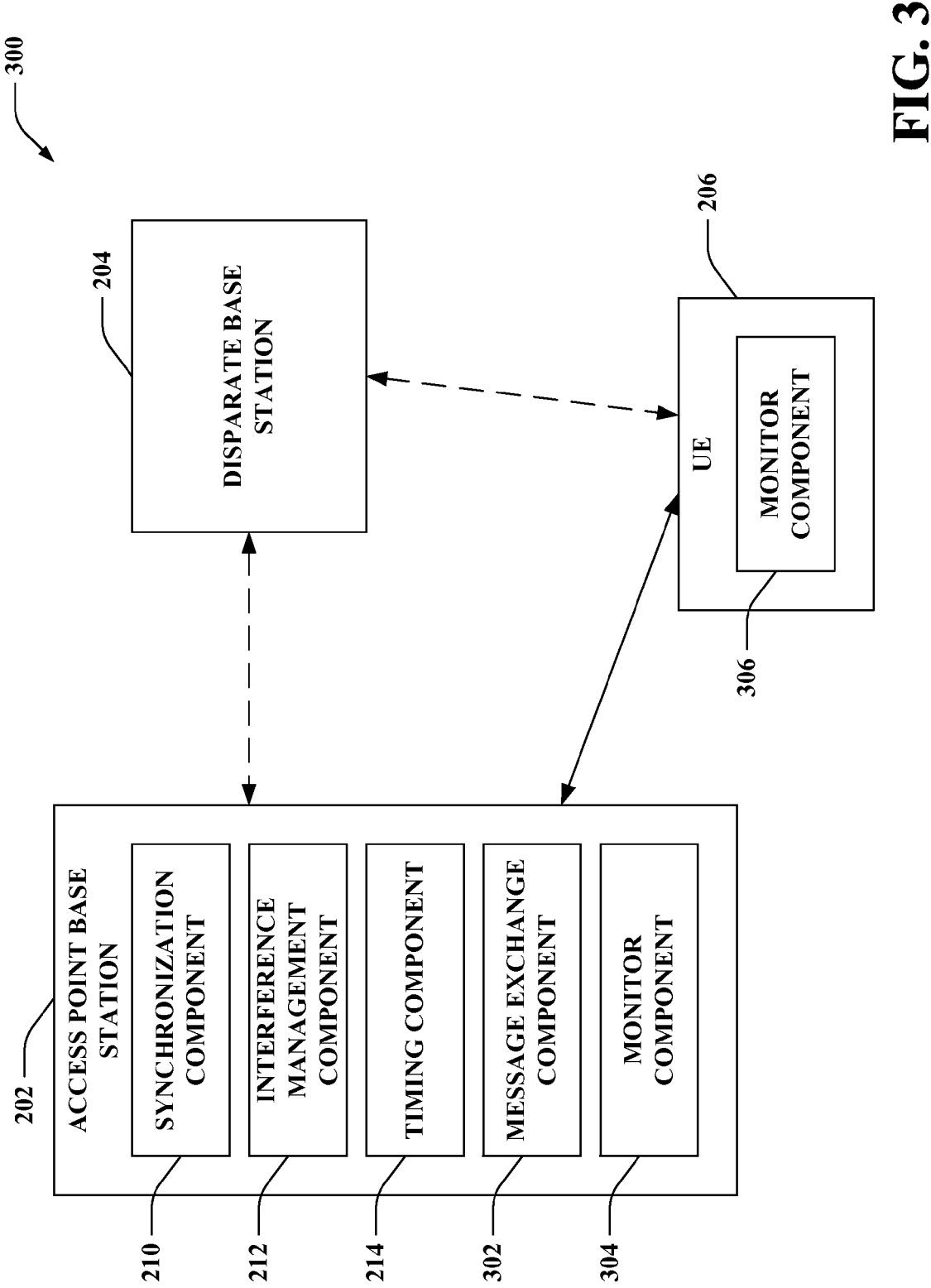
FIG. 3 is an illustration of an example system that exchanges backhaul messages for timing and TDD configuration in a wireless communication environment.

With reference to FIG. 3, illustrated is a system 300 that exchanges backhaul messages for timing and TDD configuration in a wireless communication environment. System 300 includes access point base station 202, disparate base station 204, and UE 206. Although not shown, it is further contemplated that system 300 can include any number of other base station(s), any number of other UE(s) (e.g., disparate UE 208 of FIG. 2, . . . ), differing network nodes (e.g., HeNB management system (HMS), . . . ), and so forth.

Access point base station 202 can include synchronization component 210, interference management component 212, and timing component 214. Access point base station 202 can also include a message exchange component 302, which can exchange messages on the backhaul. For example, message exchange component 302 can send and/or receive messages on the backhaul with disparate base station 204. Additionally or alternatively, message exchange component 302 can send and/or receive messages on the backhaul with other base station(s), differing network nodes, and so forth. By way of illustration, message exchange component 302 can exchange messages on the backhaul with a macro cell base station, an access point base station, an HMS, a combination thereof, or the like. It is contemplated that an HMS can also be referred to as Operations and Management (OAM).

Messages sent and/or received by message exchange component 302 can be used by synchronization component 210 to determine timing synchronization. Further, messages exchanged over the backhaul can be employed by access point base station 202 to identify a TDD configuration to be implemented. A TDD configuration can refer to subframe(s) (e.g., time period(s), ... ) from a radio frame during which a base station transmits signals over the downlink and subframe(s) (e.g., time period(s), ... ) from a radio frame during which the base station receives signals over the uplink. It is to be appreciated, however, that the claimed subject matter is not limited to the foregoing. Moreover, content of messages transferred over the backhaul via message exchange component 302 can include measurements performed by a base station (e.g., effectuated by access point base station 202, disparate base station 204, ... ), measurements performed by a UE (e.g., UE 206, disparate UE 208 of FIG. 2, ... ), TDD configuration information of a base station (e.g., access point base station 202, disparate base station 204, ... ), timing information (e.g., network timing protocol synchronization (NTPS) timing information, ... ), and so forth.

Access point base station 202 can further include a monitor component 304 that can yield measurements of neighboring cell(s) (e.g., disparate base station 204, ... ), neighboring UE(s) (e.g., disparate UE 208 of FIG. 2, ... ), and the like. For example, monitor component 304 can measure signal strength of a signal transmitted by disparate base station 204. Further, monitor component 304 can identify timing of disparate base station 204. Moreover, monitor component 304 can recognize a CSG associated with disparate base station 204 and/or a TDD configuration utilized by disparate base station 204. Although not shown, it is also contemplated that monitor component 304 can detect signal strength, timing, associated CSG, TDD configuration, and the like for any other base station(s) within proximity. By way of another example, monitor component 304 can measure signal strength of a signal transmitted by a UE served by a differing base station (e.g., disparate UE 208 of FIG. 2 served by disparate base station 204, ... ) and/or timing of the UE served by the differing base station. Message exchange component 302 can send messages that include information collected by monitor component 304 over the backhaul (e.g., to disparate base station 204, other base station(s), differing network nodes, ... ). Further, message exchange component 302 can receive messages that include information similarly measured by disparate base station 204 and/or any other base station(s) sent over the backhaul.

Moreover, UE 206 (e.g., served by access point base station 202, ... ) can further include a monitor component 306 that can yield measurements of neighboring cell(s) (e.g., disparate base station 204, ... ). Pursuant to an example, monitor component 306 can measure signal strength of a signal sent by disparate base station 204, timing of disparate base station 204, a CSG associated with disparate base station 204, and/or a TDD configuration employed by disparate base station 204. UE 206 can report measurements yielded by monitor component 306 to access point base station 202. Further, message exchange component 302 can send messages that include information collected by monitor component 306 and fed back from UE 206 over the backhaul (e.g., to disparate base station 204, other base station(s), differing network nodes, ... ). Moreover, message exchange component 302 can receive messages that include information similarly measured by a disparate UE (e.g., disparate UE 208 of FIG. 2, ... ) and fed back to disparate base station 204 and/or any other base station(s) via the backhaul.

As set forth above, messages exchanged over the backhaul (e.g., via employing message exchange component 302, ... ) can include at least one of the following. The messages can include UE measurements (e.g., yielded by monitor component 306 of UE 206, ... ) such as neighboring cell signal strength, CSG of the neighboring cell, timing, TDD configuration, and so forth. Further, the messages can include base station measurements of a neighboring cell (e.g., measurements of disparate base station 204 yielded by monitor component 304 of access point base station 202, ... ) such as signal strength, CSG of the neighboring cell, timing, TDD configuration, and the like. Moreover, the messages can include base station measurements of a neighboring UE (e.g., measurements of disparate UE 208 of FIG. 2 served by disparate base station 204 yielded by monitor component 304 of access point base station 202, ... ) such as signal strength, timing, and the like. The messages can additionally or alternatively include TDD configuration information of a sending base station (e.g., TDD configuration information of access point base station 202 or disparate base station 204, ... ) and/or NTPS timing information. It is to be appreciated, however, that the claimed subject matter is not limited to exchanging messages over the backhaul for determining synchronization and/or TDD configuration, as other techniques described herein need not rely upon backhaul message exchange.

According to another example, interference management component 212 can use coordinated silence to allow monitor component 304 and/or message exchange component 302 of access point base station 202 to monitor disparate base station 204 (and/or any other base station(s)) to acquire configuration. For the TDD specific case, message exchange component 302 can monitor the backhaul to obtain uplink-downlink partitioning. Yet, it is also contemplated that coordinated silence generally can also be used for monitoring to acquire configuration for frequency division duplexing (FDD) as well. By way of further illustration, a base station (or set of base stations) (e.g., macro cell base station(s), disparate base station 204, ... ) can advertise itself over-the-air (OTA) or backhaul as being a master node; thus, message exchange component 302 and/or monitor component 304 can receive such advertisement, and interference management component 212 can choose a configuration for access point base station 202 based on observations (e.g., collected by message exchange component 302 and/or monitor component 304, ... ) of the base station advertised to be the master node.

Pursuant to yet a further example, UE assisted monitoring can be used in addition to network listening effectuated by access point base station 202. For instance, access point base station 202 can listen to neighboring base station(s) (e.g., disparate base station 204, ... ) employing monitor component 304 (e.g., for OTA, ... ). Further, access point base station 202 (e.g., synchronization component 210, ... ) can roughly estimate timing of the neighboring base station(s) (e.g., by listening to OTA messages with monitor component 304, ... ). Yet, depending on distance between access point base station 202 and the neighboring base station(s), inaccuracy can be introduced in connection with estimating the timing. Thus, access point base station 202 can acquire timing to within a cyclic prefix (CP) duration (e.g., accounting for time-of-flight, ... ), while a UE (e.g., UE 206, ... ) can help make corrections within that duration. For example, monitor component 306 of UE 206 can listen for adjustments received from disparate base station 204, and information related to these adjustments can be provided to access point base station 202 to tune the timing maintained thereby.

Figure 4:
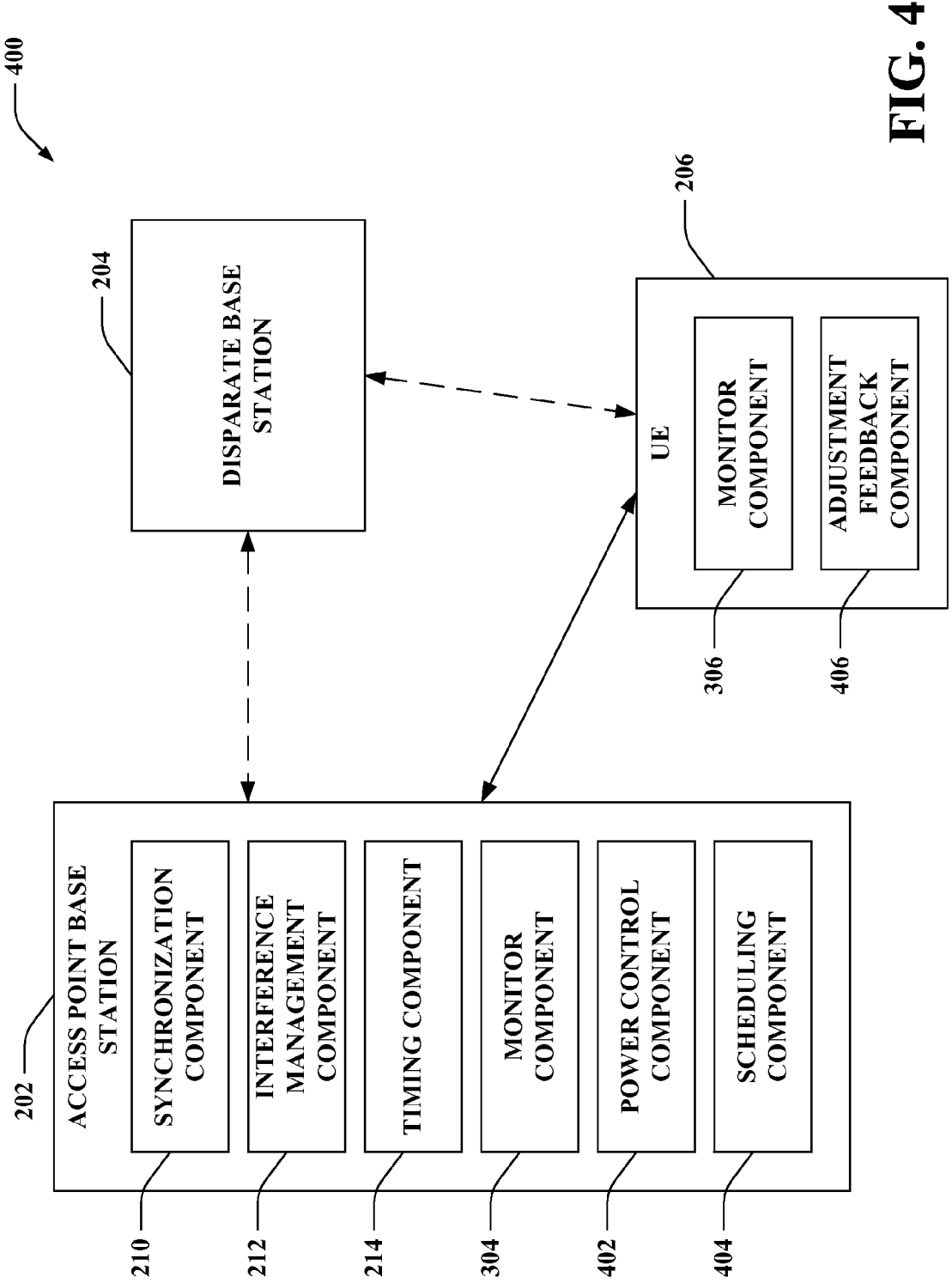
FIG. 4 is an illustration of an example system that enables managing interference under asynchronous operation in a wireless communication environment.

Now turning to FIG. 4, illustrated is a system 400 that enables managing interference under asynchronous operation in a wireless communication environment. System 400 includes access point base station 202, which can further include synchronization component 210, interference management component 212, timing component 214, and/or monitor component 304. Additionally, system 400 can include disparate base station 204 and UE 206.

Access point base station 202 can operate asynchronously. By way of example, synchronization component 210 can recognize that access point base station 202 is operating asynchronously; yet, it is contemplated that the claimed subject matter is not so limited. For instance, synchronization component 210 may be unable to synchronize access point base station 202 with disparate base station 204 (and/or any other base station(s) within proximity). By way of example, access point base station 202 and/or neighboring base station(s) (e.g., disparate base station 204, ... ) can be incapable of synchronizing. According to another example, access point base station 202 can be powered on, and thus, can be operating asynchronously at a time of start-up. While the aforementioned examples are set forth, any scenario under which access point base station 202 operates asynchronously is intended to fall within the scope of the hereto appended claims. Moreover, it is to be appreciated that one or more of the following example techniques that are described in connection with asynchronous operation can similarly be extended to synchronous operation (e.g., where synchronization component 210 synchronizes timing maintained by timing component 214 with disparate base station 204 (and/or any other base station(s) within proximity), ... ).

According to an example, when access point base station 202 operates asynchronously (e.g., as identified by synchronization component 210, ... ), synchronization component 210 can attempt to synchronize access point base station 202. Pursuant to another example, when access point base station 202 operates asynchronously (e.g., as identified by synchronization component 210, ... ), interference management component 212 can effectuate technique(s) to mitigate a probability of jamming (e.g., downlink/uplink jamming, ... ).

By way of example, when operating asynchronously, interference management component 212 can reduce a downlink cycle (e.g., in terms of configuration, ... ) at access point base station 202 to reduce the jamming probability. According to an illustration, for a 10 ms radio frame, 4 subframes (e.g., 4 ms, ... ) can initially be utilized by access point base station 202 for downlink transmission. To avoid interference, interference management component 212 can reduce the number of subframes employed by access point base station 202 for downlink transmission to 2 subframes (e.g., 2 ms, ... ) when access point base station 202 operates asynchronously, which can lower a probability of collision. Hence, interference management component 212 can alter a configuration (e.g., TDD configuration, ... ) implemented by access point base station 202 to reduce the downlink cycle when operating asynchronously.

In accordance with another example, when access point base station 202 operates asynchronously, monitor component 304 can detect a non-served UE (e.g., disparate UE 208 of FIG. 2 served by disparate base station 204, ... ) located nearby access point base station 202. For instance, a signal sent by the non-served UE can be detected by monitor component 304. The signal can be, for example, a Sounding Reference Signal (SRS), a Reference Signal (RS), a Physical Uplink Control Channel (PUCCH) transmission, a Physical Uplink Shared Channel (PUSCH) transmission, and so forth. Based upon the detected signal from the non-served UE, synchronization component 210 can adjust timing maintained by timing component 214. Additionally or alternatively, power can be altered in reaction to the detected signal from the non-served UE obtained by monitor component 304. For instance, access point base station 202 can further include a power control component 402, which can manage a power level utilized by access point base station 202 for sending a transmission over the downlink and/or a power level employed by UE 206 for sending a transmission over the uplink. Power control component 402 (e.g., as controlled by interference management component 212, ... ) can adjust a power level used by access point base station 202 and/or UE 206 based upon the detected signal from the non-served UE collected by monitor component 304. Synchronization component 210 and/or interference management component 212 can analyze signals sent by non-served UE(s) and detected by monitor component 304 to derive information concerning respective serving cell(s) of the non-served UE(s).

Moreover, access point base station 202 can include a scheduling component 404 that schedules UE(s) (e.g., UE 206, ... ) served thereby. For instance, scheduling component 404 can schedule wake-up cycles for UE 206. Further, UE 206 can include monitor component 306 and an adjustment feedback component 406. When access point base station 202 operates asynchronously, monitor component 306 of UE 206 served by access point base station 202 can detect a timing difference between access point base station 202 (e.g., serving cell, ... ) and disparate base station 204 (e.g., neighboring cell, neighboring cell, any other base station, ... ). The timing difference can be recognized by monitor component 306 based upon downlink relative timing measurements. Further, adjustment feedback component 406 can identify a timing adjustment for access point base station 202 (e.g., serving cell, ... ) based upon the timing difference. Adjustment feedback component 406 (e.g., or UE 206 generally, ... ) can send the timing adjustment over the uplink to access point base station 202. Synchronization component 210 can alter the timing maintained by timing component 214 as a function of the timing adjustment fed back from UE 206.

According to an example, scheduling component 404 can schedule wake-up cycles for UE 206 as a function of a position of UE 206. If UE 206 is located at a boundary of two cells, then scheduling component 404 can allot a greater percentage of time for UE 206 being awake. For instance, duration of an awake portion of the cycle can be extended, duration of a sleep portion of the cycle can be decreased, a frequency of being awake can be increased, and so forth. UE 206 can be scheduled to be awake more often when located at the boundary of two cells to provide more timing adjustments (e.g., as yielded by adjustment feedback component 406, ... ). Pursuant to another example, scheduling component 404 can schedule wake-up cycles for UE 206 as a function of whether access point base station 202 is synchronized or unsynchronized. When unsynchronized, scheduling component 404 can schedule UE 206 to wake up more often to provide more timing adjustments (e.g., as yielded by adjustment feedback component 406, ... ). Even when synchronized, periodic timing adjustment from UE 206 can mitigate clock drift, thereby allowing timing component 214 to maintain accurate timing.

The timing adjustments generated by adjustment feedback component 406 can be sent over the uplink to access point base station 202. A physical channel can carry the timing adjustments. For instance, the physical layer channelization of the timing adjustments can be on one of PUCCH, PUSCH, or a Physical Random Access Channel (PRACH).

It is also contemplated that interference management component 212 can employ one or more of the following techniques to minimize jamming caused by access point base station 202. For example, interference management component 212 can alter the access mode utilized by access point base station 202. Following this example, interference management component 212 can declare access point base station 202 to be an open access point base station (e.g., employ open access mode, . . . ) or a hybrid access point base station (e.g., employ hybrid access mode, . . . ), thereby transitioning from being a CSG access point base station. Upon interference management component 212 changing the access mode, access point base station 202 can be accessible to non-members of an associated CSG. For instance, non-members can be provided with limited service compared to members of the associated CSG, members of the associated CSG can have preferred service, billing, etc. compared to non-members of the associated CSG, and so forth. According to another example, interference management component 212 can manage power control component 402 to reduce transmit power of access point base station 202 and/or transmit power of UE(s) (e.g., UE 206, . . . ) served by access point base station 202. By way of yet another example, interference management component 212 can reduce a duty cycle of access point base station 202. In accordance with this example, interference management component 212 can reduce the duty cycle by scheduling UE(s) (e.g., UE 206, . . . ) served by access point base station 202 on a limited number of subframes on the downlink and/or uplink, increasing a number of multimedia broadcast over a single frequency network (MBSFN) subframes, and/or increasing a number of blank subframes. Pursuant to another example, interference management component 212 can use a configuration with fewer subframes on the downlink to reduce downlink jamming. It is to be appreciated that the foregoing techniques can be used for access point base station 202 (e.g., TDD access point base station, . . . ) when in asynchronous operation or synchronous operation (e.g., duty cycle can be reduced by interference management component 212 when in idle mode for synchronous operation, . . . ). Moreover, it is contemplated that the aforementioned techniques can be used for an access point base station that leverages FDD; yet, the claimed subject matter is not so limited.

Figure 5:
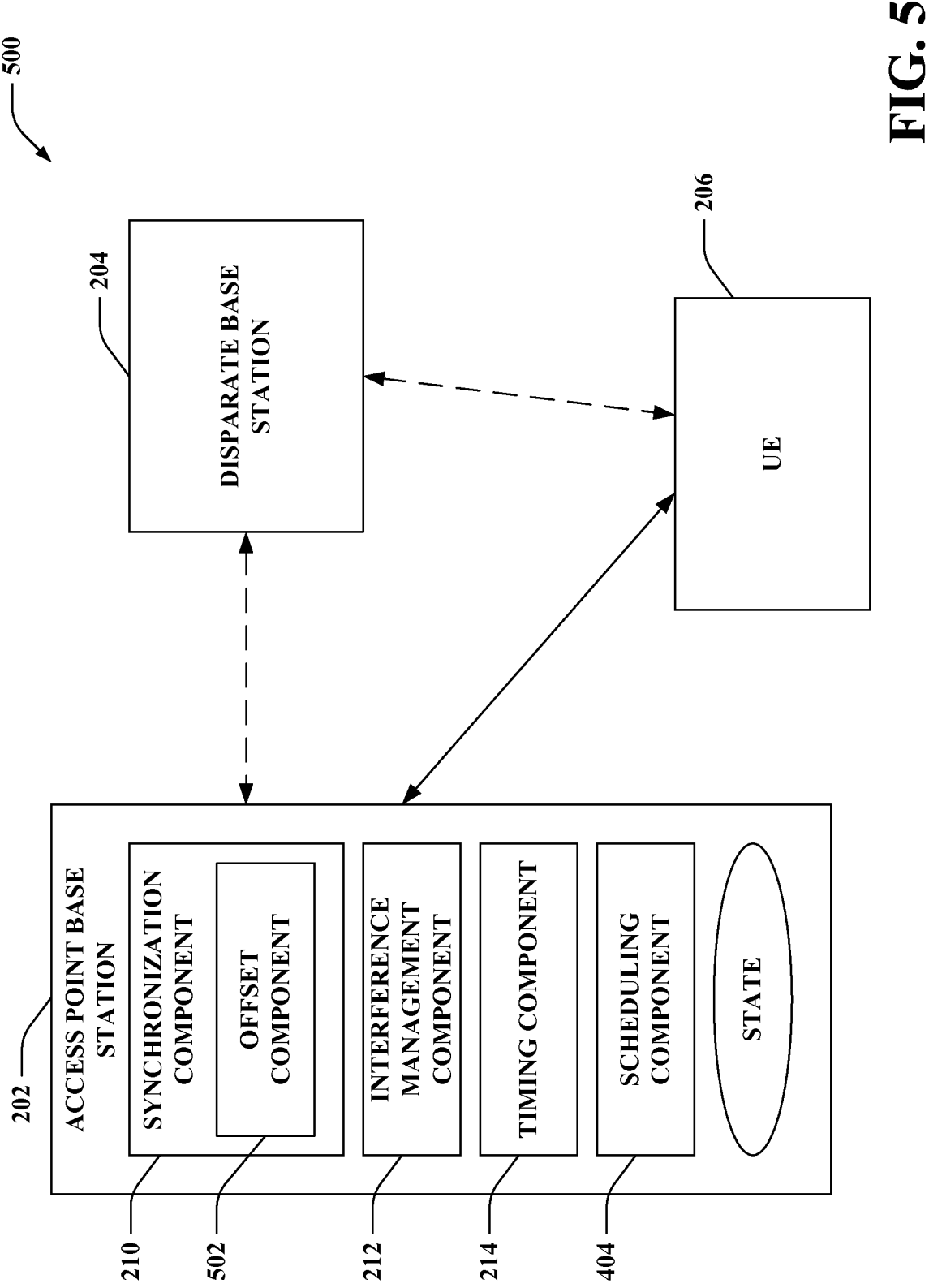
FIG. 5 is an illustration of an example system that enables managing interference under synchronous operation in a wireless communication environment.

With reference to FIG. 5, illustrated is a system 500 that enables managing interference under synchronous operation in a wireless communication environment. System 500 includes access point base station 202, which can further include synchronization component 210, interference management component 212, timing component 214, and/or scheduling component 404. Additionally, system 500 can include disparate base station 204 and UE 206.

Under synchronous operation, interference management component 212 can coordinate the TDD configuration utilized by access point base station 202 with disparate base station 204 (and/or any other base station(s)). Thus, the TDD configuration employed by access point base station 202 can be coordinated with neighboring access point base station(s), neighboring macro cell base station(s), and the like. Moreover, interference management component 212 can change the TDD configuration used by access point base station 202 over time; yet, the claimed subject matter is not so limited as it is contemplated that the TDD configuration employed by access point base station 202 can be static.

According to an illustration, interference management component 212 can coordinate the TDD configuration employed by access point base station 202 with disparate base station 204. For example, the same TDD configuration can be used by both access point base station 202 and disparate base station 204 (e.g., both access point base station 202 and disparate base station 204 can either transmit via the downlink or receive via the uplink during a given subframe, . . . ). Pursuant to another example, interference management component 212 can select a TDD configuration for use by access point base station 202 that complements a TDD configuration employed by disparate base station 204. Following this example, the TDD configuration chosen by interference management component 212 for utilization by access point base station 202 can reduce mutual interference. For instance, the TDD configuration elected by interference management component 212 for use by access point base station 202 can include a smaller number of subframes used for downlink transmission as compared to the TDD configuration used by disparate base station 204 (e.g., macro cell base station, . . . ). Thus, although access point base station 202 and disparate base station 204 can be synchronous, the aforementioned differential selection of TDD configurations can provide additional protection to mitigate interference caused there between.

Different TDD configurations can be used by access point base station 202 and disparate base station 204 for various reasons. For instance, access point base station 202 can serve a small number of UEs (e.g., UE 206, . . . ), while disparate base station (e.g., macro cell base station, . . . ) can serve a greater number of UEs (not shown). The TDD configuration leveraged by access point base station 202 as controlled by interference management component 212 can be selected to reduce the air interface capacity of access point base station 202. By way of example, instead of using 6 subframes for downlink transmission (e.g., as used by disparate base station 204, . . . ), access point base station 202 can use a TDD configuration where 4 subframes are employed for downlink transmission. Accordingly, since access point base station 202 can be a dominant jammer to a UE (e.g., disparate UE 208 of FIG. 2, . . . ) located nearby access point base station 202 and served by disparate base station 204, and because the UE can be unable to connect to access point base station 202 (e.g., the UE can be a non-member of a CSG associated with access point base station 202, . . . ), then the UE can receive downlink transmissions from disparate base station 204 via the remaining subframes (e.g., the remaining 2 subframes used by disparate base station 204 for downlink transmission yet inhibited from being used for downlink transmission by access point base station 202, . . . ).

Moreover, synchronization component 210 can further include an offset component 502, which can implement a subframe offset for access point base station 202. The subframe offset can cause the timing maintained by timing component 214 to be shifted. For example, the subframe offset can be two subframes; however, it is to be appreciated that the claimed subject matter is not so limited (e.g., the subframe offset can be substantially any number of subframes, the subframe offset can be predefined, the subframe offset can be dynamically selected, . . . ).

In accordance with an example, offset component 502 can use a subframe offset as a function of a state (e.g., idle versus active, . . . ) of access point base station 202. Following this example, if access point base station 202 is in an idle state, then offset component 502 can implement the subframe offset. When in idle state, access point base station 202 can transmit a broadcast channel without serving a UE. Further, upon UE 206 accessing access point base station 202, offset component 502 of access point base station 202 can remove the subframe offset. Alternatively, if access point base station 202 is in an active state (e.g., serving UE 206, . . . ), then offset component 502 need not provide the subframe offset. When in the active state, scheduling component 404 can schedule lower rates on the subframes where interference is identified (e.g., by interference management component 212, . . . ). Moreover, access point base stations in active state can perform appropriate power control to avoid interference there between (e.g., negotiate for active traffic, . . . ).

According to another example, offset component 502 can implement a subframe offset regardless of the state of access point base station 202 (e.g., shift in timing compared to timing used by disparate base station 204 which can be a macro cell base station, an access point base station, . . . ). Pursuant to this example, uplink transmission by UE 206 served by access point base station 202 can be scheduled on a common uplink subframe to avoid uplink to downlink jamming. It is to be appreciated, however, that the claimed subject matter is not limited to the foregoing example.

System 500 can support utilizing different TDD configurations (e.g., downlink/uplink configurations, . . . ) and/or subframe offsets. Accordingly, synchronization signals can occur in different subframes in a TDD deployment, in contrast to conventional approaches where synchronization signals occur in common subframe(s). Moreover, when searching for synchronization signals, a UE (e.g., UE 206, . . . ) can be aware that synchronization signals can be staggered in time. Hence, the UE can be aware of a gap and can search for synchronization signals accordingly. For instance, the UE can search for synchronization signals in designated uplink subframes due to utilization of subframe offsets. Further, it is contemplated that a base station (e.g., access point base station 202, disparate base station 204, . . . ) can provide the UE with measurement gaps to perform the aforementioned search. By way of example, the measurement gaps provided to the UE can be enlarged, shifted, a combination thereof, and so forth.

When different TDD configurations and/or subframe offsets are used, as in system 500, downlink/uplink jamming can result. Downlink/uplink jamming can also result when TDD base stations are out-of-sync. Thus, transmission by a first UE can jam reception by a second UE, and transmission by a first base station can jam reception by a second base station. Typically, downlink/uplink jamming does not occur because orthogonal resources are used for receiving and transmitting. Below, various example techniques that can mitigate a detrimental impact of downlink/uplink jamming are set forth. For instance, one or more of the example techniques can be effectuated (at least in part) by interference management component 212 of access point base station 202. Moreover, it is contemplated that UE 206 can include an interference management component (not shown) that can implement (at least a portion of) one or more of the following example techniques; yet, the claimed subject matter is not so limited.

An example technique that can be used in system 500 is estimating UE to UE jamming and/or base station to base station jamming. Further, power control (e.g., as managed by power control component 402 of FIG. 4, . . . ) can be implemented based upon the estimation of the jamming. For example, interference management component 212 of access point base station 202 can estimate jamming caused thereby to disparate base station 204, and based upon the estimate, access point base station 202 can control its transmit power to reduce this interference to disparate base station 204; however, it is to be appreciated that the claimed subject matter is not so limited.

According to another example technique, access point base station 202 (e.g., message exchange component 302 of FIG. 3, monitor component 304 of FIG. 3, . . . ) can monitor power control commands from disparate base station 204. For instance, the power control commands sent by disparate base station 204 can be monitored through an OTA mechanism (e.g., network listening, effectuated by monitor component 304 of FIG. 3, . . . ). Pursuant to an illustration, such monitoring at access point base station 202 can be performed using components of a mobile station modem (MSM) included in access point base station 202, thereby allowing access point base station 202 to act similarly to a UE; yet, it is to be appreciated that the claimed subject matter is not so limited. By monitoring the power control commands, access point base station 202 can recognize how disparate base station 204 controls transmit power of UE(s) (e.g., disparate UE 208 of FIG. 2, . . . ) served by disparate base station 204. Additionally or alternatively, an overload-indicator and/or similar messages can be received by access point base station 202 (e.g., message exchange component 302 of FIG. 3, . . . ) on the backhaul.

A further example technique pertains to tunneling power control commands. For instance, UE 206 served by access point base station 202 can listen for power control commands sent by disparate base station 204. Further, UE 206 can tunnel the power control commands received from disparate base station 204 to access point base station 202.

In accordance with yet another example technique, components of a cell site modem (CSM) can be included in UE 206 to sense interference and power control accordingly. Conventionally, without including CSM components in UE 206 can result in UE 206 being unable to detect an uplink transmission from a differing UE (e.g., disparate UE 208 of FIG. 2, . . . ). In contrast, by leveraging CSM components, UE 206 can differentiate between a control signal, reference signal, pilot, etc. sent by the differing UE over the uplink and a downlink waveform sent by disparate base station 204. Thus, UE 206 can detect when an uplink transmission from the differing UE is jamming the downlink for UE 206 (e.g., recognize the differing UE to be a jammer, . . . ). By way of further illustration, UE 206 can power control the differing UE (e.g., send power control commands to the differing UE to cause the differing UE to lower its transmit power, . . . ).

Moreover, beam steering can be used to avoid interference in system 500. Following are example approaches that can be utilized to mitigate interference by implementing beam steering. It is contemplated that beam steering can be implemented by a base station (e.g., access point base station 202, disparate base station 204, . . . ) and/or a UE (e.g., UE 206, . . . ).

For example, UE 206 can include multiple antennas, and can beam steer to avoid interference to a restricted cell (e.g., CSG base station, . . . ). Following this example, UE 206 can be located nearby a CSG base station (not shown) which is not accessible by UE 206 (e.g., UE 206 can be a non-member of a CSG associated with the CSG base station, . . . ). While trying to communicate with its serving cell, UE 206 can overwhelm the non-accessible CSG base station with interference. Thus, UE 206 can form a beam that has a null towards the non-accessible CSG base station. For instance, channel reciprocity can be used by UE 206 to determine channel directions. Additionally or alternatively, a base station (e.g., the serving cell of UE 206, . . . ) can perform receive interference nulling.

According to another example, access point base station 202 can make use of the uplink channel to beam away from a differing UE (e.g., disparate UE 208 of FIG. 2, served by disparate base station 204, . . . ). For instance, the differing UE can be unable to connect to access point base station 202 (e.g., the differing UE can be a non-member of a CSG associated with access point base station 202, . . . ). Access point base station 202 can declare fewer transmit antennas than actually present to make the foregoing transparent to the differing UE (e.g., for control channels, . . . ). By way of illustration, if access point base station 202 includes four transmit antennas (e.g., four physical transmit antennas, . . . ), then access point base station 202 can advertise two effective antennas; however, the claimed subject matter is not so limited. Moreover, information about the differing UE can be sent over the backhaul to help in uplink channel estimation. The information, for instance, can include a cell radio network temporary identifier (c-RNTI), SRS configuration, and so forth. Further, it is contemplated that such information need not be exchanged over the backhaul, and rather, access point base station 202 can blindly detect the uplink channel of the differing UE.

Figure 6:
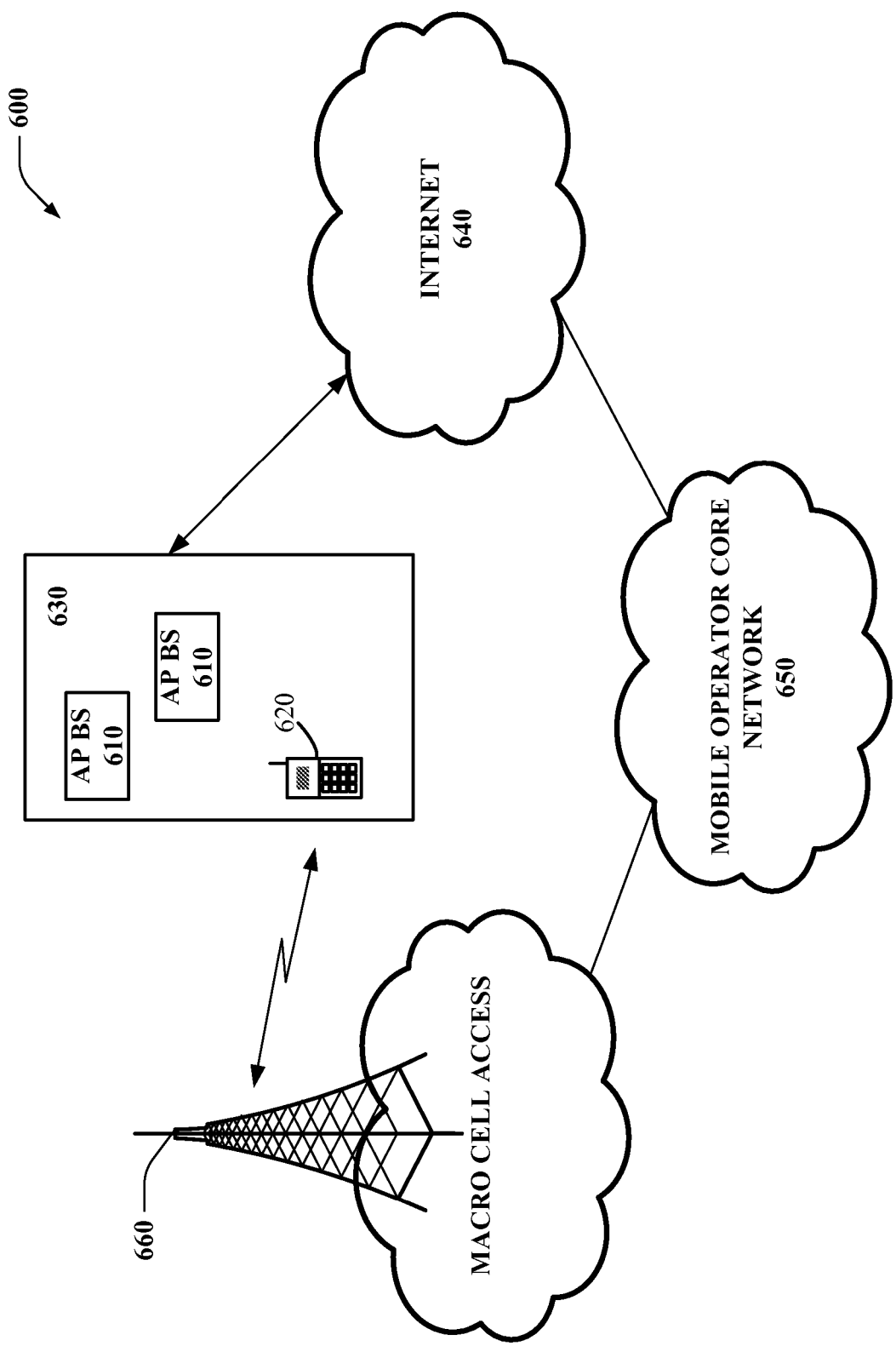
FIG. 6 is an illustration of an example system that enables deployment of access point base stations (e.g., femto cell base stations, . . . ) within a network environment.

FIG. 6 illustrates an exemplary communication system 600 that enables deployment of access point base stations (e.g., femto cell base stations, . . . ) within a network environment. As shown in FIG. 6, system 600 includes multiple access point base stations, which can also be referred to as femto cell base stations, Home Evolved Node B units (HeNBs), Home Node B unit (HNB), femto cells, or the like. The access point base stations (AP BSs 610), for example, can each be installed in a corresponding small scale network environment, such as, for example, in one or more user residences 630, and can each be configured to serve associated, as well as alien, UE(s) 620. Each AP BS 610 is further coupled to the Internet 640 and a mobile operator core network 650 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1×RTT, 1×EV-DO Rel0, RevA, RevB) technology and other known and related technologies. In such embodiments described herein, the owner of AP BS 610 can subscribe to mobile service, such as, for example, 3G mobile service, offered through the mobile operator core network 650, and UE 620 can be capable to operate both in a macro cellular environment via a macro cell base station 660 and in a residential small scale network environment. Thus, AP BS 610 can be backward compatible with any existing UE 620. It is contemplated that AP BSs 610 can include CSG AP BS(s), hybrid AP BS(s), and/or open AP BS(s).

Figure 7:
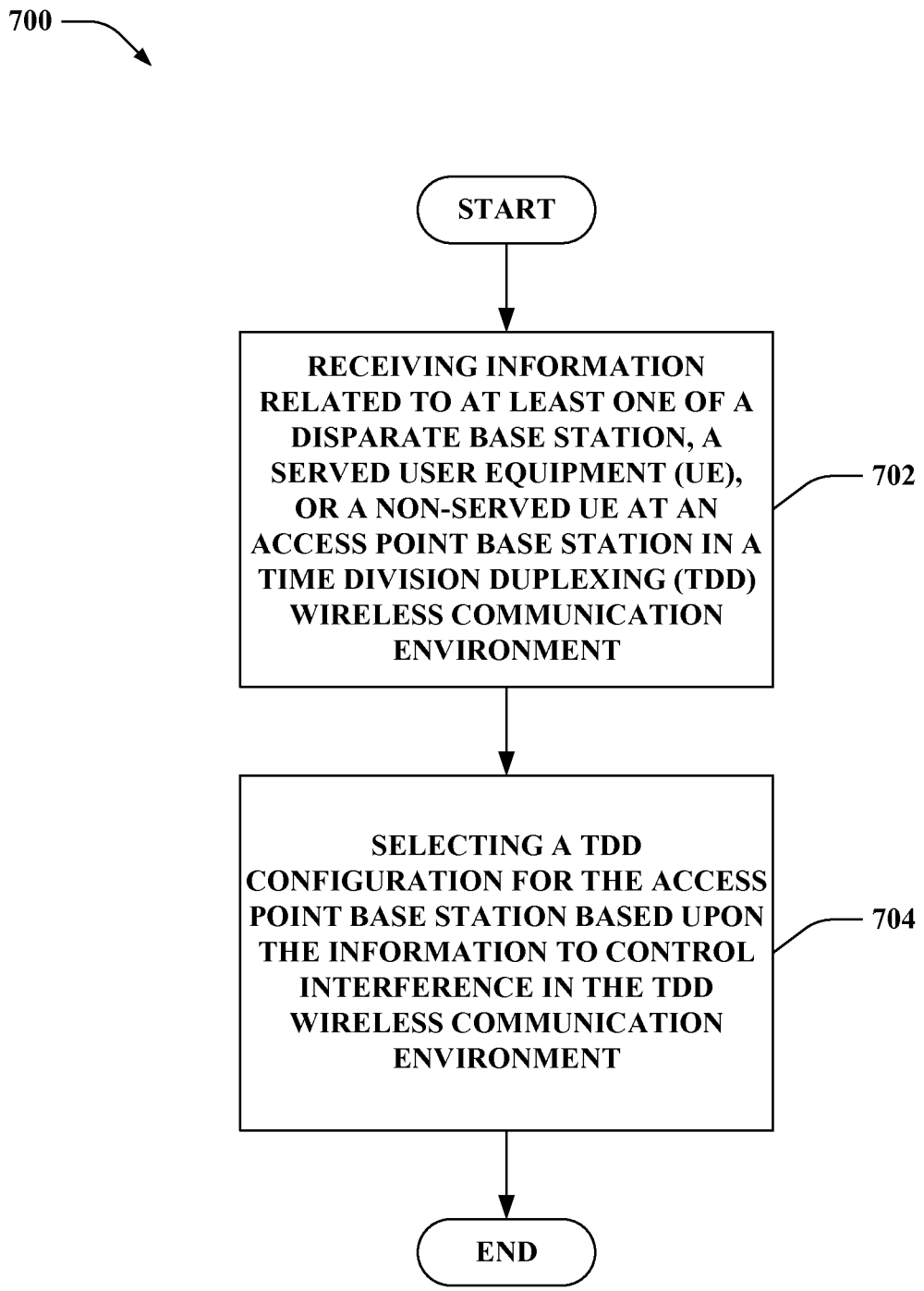
FIG. 7 is an illustration of an example methodology that facilitates mitigating interference in a wireless communication environment.
Figure 8:
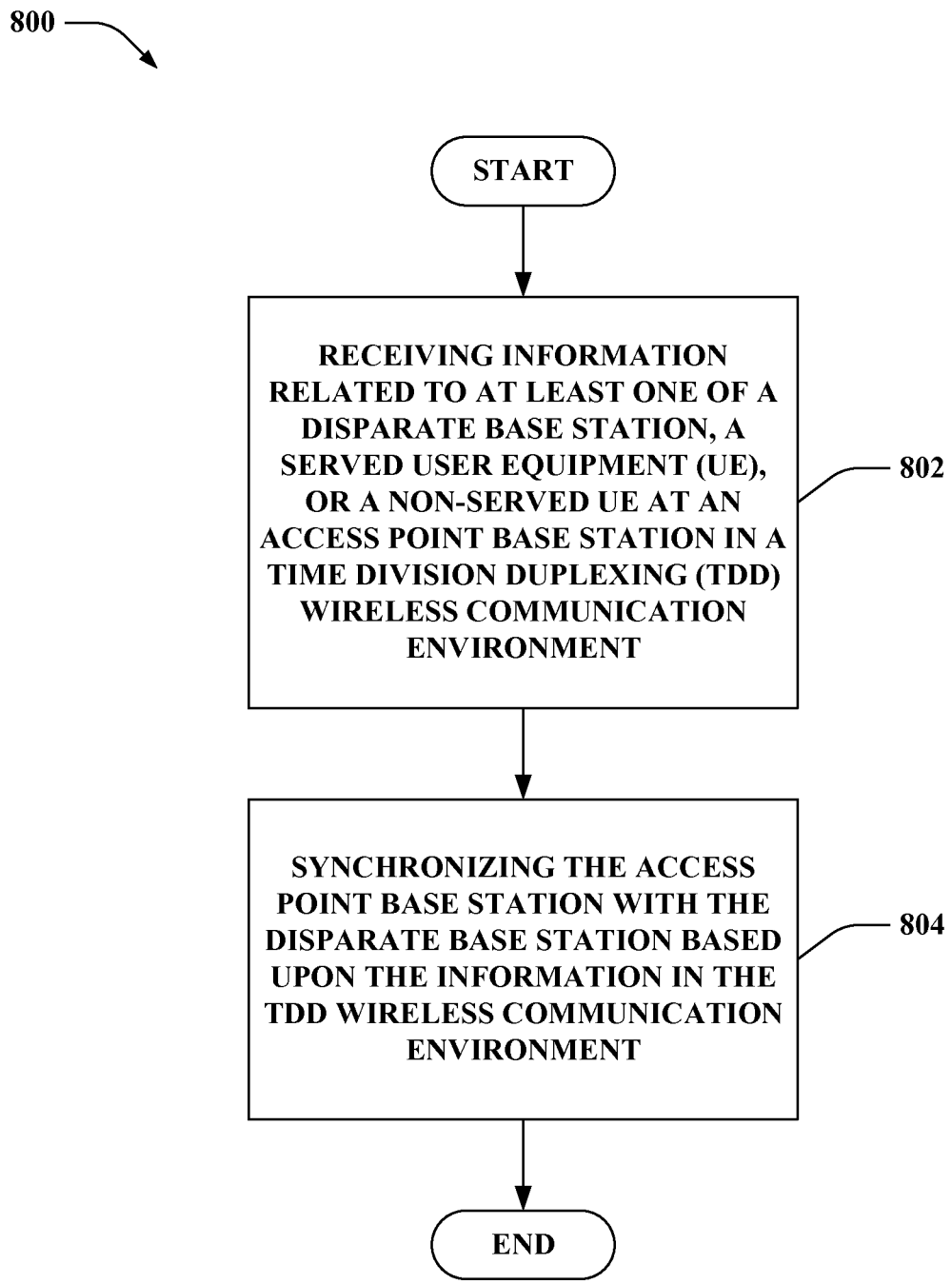
FIG. 8 is an illustration of an example methodology that facilitates establishing synchronization in a wireless communication environment.
Figure 9:
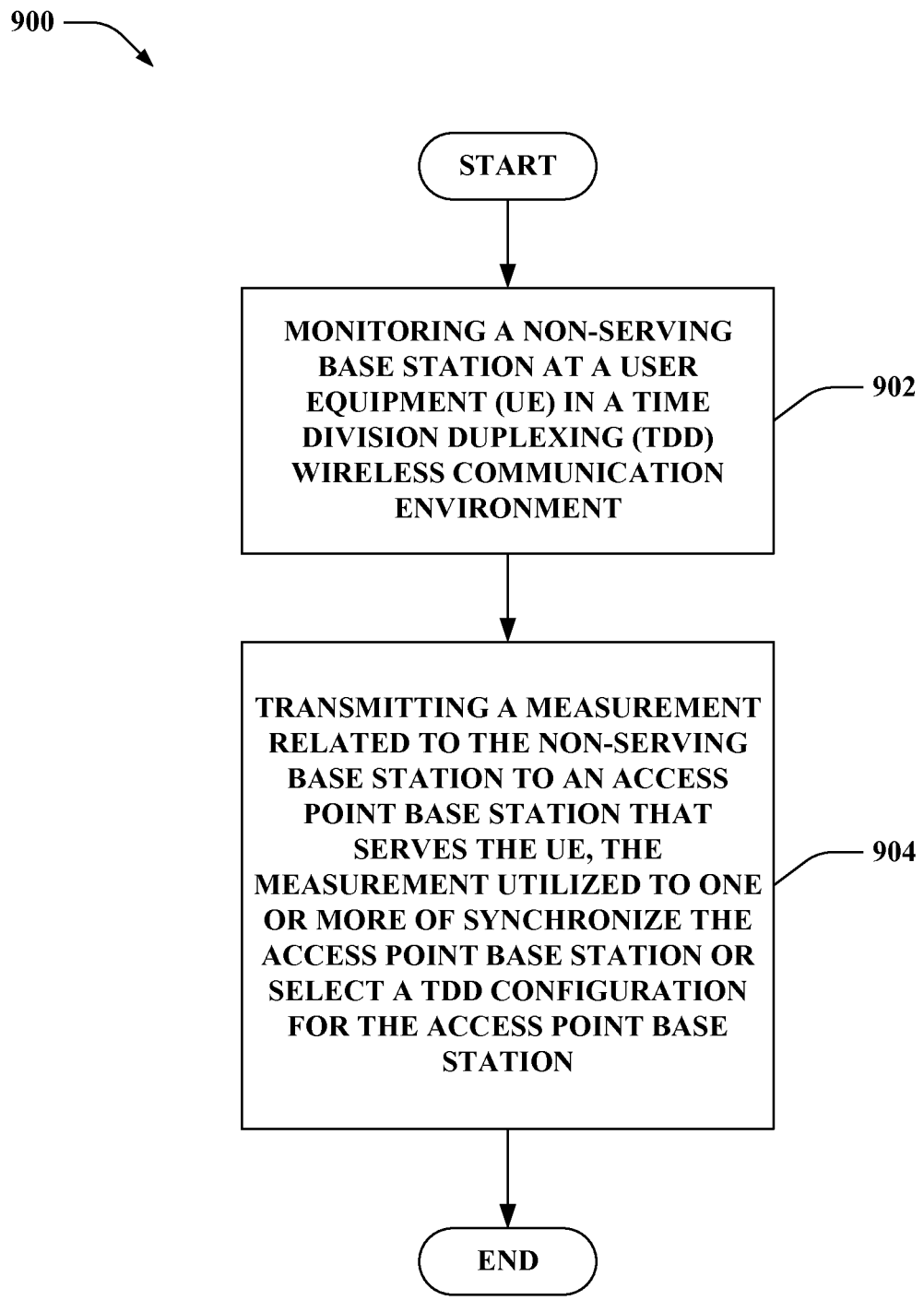
FIG. 9 is an illustration of an example methodology that facilitates supplying feedback for establishing synchronization and/or mitigating interference in a wireless communication environment.

Referring to FIGS. 7-9, methodologies relating to establishing synchronization and/or managing interference in a TDD wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, illustrated is a methodology 700 that facilitates mitigating interference in a wireless communication environment. At 702, information related to at least one of a disparate base station, a served user equipment (UE), or a non-served UE can be received at an access point base station in a time division duplexing (TDD) wireless communication environment. The information, for instance, can be received over-the-air (OTA), via a backhaul, a combination thereof, and so forth. Moreover, the access point base station can be a closed subscriber group (CSG) access point base station that is accessible by members of an associated CSG and non-accessible by non-members of the CSG; however, it is to be appreciated that the claimed subject matter is not so limited. Further, the disparate base station can be a macro cell base station; yet, it is contemplated that the claimed subject matter is not so limited. The disparate base station can be located within proximity of the access point base station (e.g., the disparate base station and the access point base station can be neighboring base stations, . . . ). The served UE can be served by the access point base station, while the non-served UE can be served by a base station other than the access point base station. For instance, the non-served UE can be served by the disparate base station; yet, it is to be appreciated that the claimed subject matter is not so limited.

According to an example, the information received at the access point base station can include messages exchanged over a backhaul. The messages exchanged over the backhaul can include a UE measurement of a neighboring cell (e.g., signal strength, CSG, timing, TDD configuration, . . . ), a base station measurement of a neighboring cell (e.g., signal strength, CSG, timing, TDD configuration, . . . ), a base station measurement of a neighboring UE (e.g., signal strength, timing, . . . ), configuration information of a base station, timing information, and so forth. For instance, the messages exchanged over the backhaul can be received from a Home Evolved Node B (HeNB) management system (HMS); yet, it is contemplated that the messages exchanged over the backhaul can additionally or alternatively be received from the disparate base station (e.g., macro cell base station, . . . ), any other base station (e.g., a differing access point base station, . . . ), and so forth. By way of another example, the information received at the access point base station can include a signal detected from the non-served UE. Following this example, the detected signal can be a Sounding Reference Signal (SRS), a Reference Signal (RS), a Physical Uplink Control Channel (PUCCH) transmission, a Physical Uplink Shared Channel (PUSCH) transmission, and so forth. Pursuant to a further example, the information received at the access point base station can include an advertisement indicating that the disparate base station is a master node. In accordance with another example, the information received at the access point base station can be a power control command sent by the disparate base station. Following this example, the power control command can be received by monitoring OTA, via a backhaul message (e.g., overload-indicator, . . . ), and so forth. By way of yet another example, the information received at the access point base station can be a power control command sent by the disparate base station tunneled from the served UE. Moreover, a combination of the aforementioned example messages can be received; yet, it is to be appreciated that the claimed subject matter is not so limited.

At 704, a TDD configuration for the access point base station can be selected based upon the information to control interference in the TDD wireless communication environment. The TDD configuration can refer to subframe(s) (e.g., time period(s), . . . ) from a radio frame during which the access point base station transmits signals over the downlink and subframe(s) (e.g., time period(s), . . . ) from the radio frame during which the base station receives signals over the uplink. According to an example, the access point base station can be recognized as operating asynchronously based upon the information (e.g., timing of the access point base station can differ from timing of the disparate base station, the access point base station can be unable to synchronize with the disparate base station, upon powering on the access point base station, . . . ). Thus, following this example, the TDD configuration selected can reduce the downlink cycle at the access point base station to reduce a jamming probability.

By way of another example, the access point base station can be identified as operating synchronously based upon the information (e.g., timing of the access point base station can be synchronized to timing of the disparate base station, . . . ). In accordance with this example, the TDD configuration can be selected to coordinate with a TDD configuration utilized by the disparate base station. For instance, the TDD configuration selected for the access point base station can be the same as the TDD configuration utilized by the disparate base station. According to another illustration, the TDD configuration selected for the access point base station can complement the TDD configuration utilized by the disparate base station to reduce mutual interference.

Pursuant to yet another example, a subframe offset can be implemented by the access point base station when operating synchronously as a function of a state of the access point base station. In accordance with an illustration, the subframe offset can be utilized when the access point base station is in idle state, while use of the subframe offset can be inhibited when the access point base station is in active state. Further, upon access by the served UE, the access point base station can switch to active state and the subframe offset can be removed.

According to a further example, coordinated silence can be used to allow the access point base station to monitor the disparate base station to acquire the TDD configuration. Further, if the access point base station receives the advertisement indicating that the disparate base station is a master node, then the access point base station can select the TDD configuration based on observations of the disparate base station upon receiving the advertisement. By way of another example, the TDD configuration can be selected based upon power control commands sent by the disparate base station.

Pursuant to another example, jamming can be estimated based upon the information. Following this example, a technique can be implemented by the access point base station to mitigate the jamming. For instance, the technique can include transitioning the access point base station to open access mode from a closed access mode. Further, the technique can include reducing a transmit power level of the access point base station and/or reducing a transmit power level of the served UE. Moreover, the technique can include reducing the duty cycle of the access point base station. Further, the technique can include using a TDD configuration with fewer subframes on the downlink to reduce downlink jamming. Such techniques can be used when the access point base station is operating synchronously or asynchronously.

Now turning to FIG. 8, illustrated is a methodology 800 that facilitates establishing synchronization in a wireless communication environment. At 802, information related to at least one of a disparate base station, a served user equipment (UE), or a non-served UE can be received at an access point base station in a time division duplexing (TDD) wireless communication environment. At 804, the access point base station can be synchronized with the disparate base station based upon the information in the TDD wireless communication environment. For instance, timing of the access point base station can be adjusted based upon the received information to synchronize the access point base station.

According to an example, the access point base station can detect a signal from the non-served UE. The detected signal can be, for instance, a Sounding Reference Signal (SRS), a Reference Signal (RS), a Physical Uplink Control Channel (PUCCH) transmission, a Physical Uplink Shared Channel (PUSCH) transmission, and so forth. Moreover, the timing of the access point base station can be adjusted as a function of the detected signal. Additionally or alternatively, a power level (e.g., transmit power level of the access point base station, transmit power level of the served UE, . . . ) can be adjusted as a function of the detected signal.

By way of another illustration, a timing adjustment can be received from the served UE. For instance, wake-up cycles for the served UE can be scheduled by the access point base station as a function of a position of the served UE, where the served UE can identify the timing adjustment based upon a timing difference between the access point base station and the disparate base station. Further, the timing of the access point base station can be adjusted as a function of the timing adjustment received from the served UE.

With reference to FIG. 9, illustrated is a methodology 900 that facilitates supplying feedback for establishing synchronization and/or mitigating interference in a wireless communication environment. At 902, a non-serving base station can be monitored at a user equipment (UE) in a time division duplexing (TDD) wireless communication environment. For example, signal strength of the non-serving base station, closed subscriber group (CSG) associated with the non-serving base station, timing of the non-serving base station, TDD configuration employed by the non-serving base station, and so forth can be measured. Further, the non-serving base station can be a macro cell base station; yet, it is to be appreciated that the claimed subject matter is not so limited.

At 904, a measurement related to the non-serving base station can be transmitted to an access point base station that serves the UE, where the measurement can be utilized to one or more of synchronize the access point base station or select a TDD configuration for the access point base station. For example, the measurement can be a timing adjustment based upon a measured timing difference between the non-serving base station and the access point base station. According to another example, the measurement can relate to a power control command received from the non-serving base station; following this example, the power control command can be tunneled to the access point base station upon being received from the non-serving base station. Pursuant to yet a further example, beam steering can be utilized by the UE to mitigate interference to the non-serving base station; yet, it is to be appreciated that the claimed subject matter is not so limited.

It will be appreciated that, in accordance with one or more aspects described herein, inferences can be made in connection with establishing synchronization and/or managing interference in a TDD wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
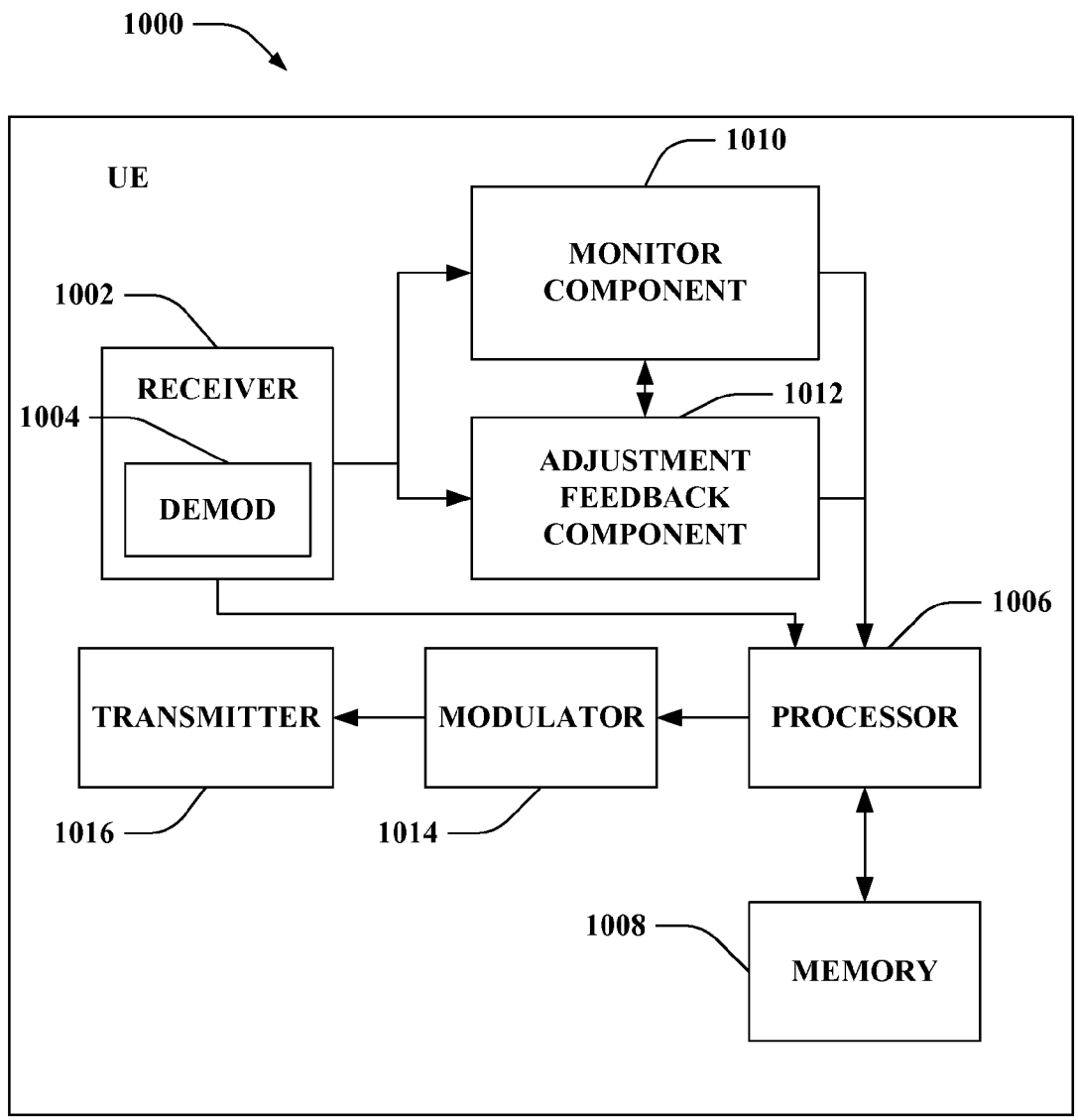
FIG. 10 is an illustration of an example UE that sends feedback to an access point base station in TDD a wireless communication system.

FIG. 10 is an illustration of a UE 1000 that sends feedback to an access point base station in TDD a wireless communication system. UE 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of UE 1000, and/or a processor that both analyzes information received by receiver 1002, generates information for transmission by transmitter 1016, and controls one or more components of UE 1000.

UE 1000 can additionally comprise memory 1008 that is operatively coupled to processor 1006 and that can store data to be transmitted, received data, and any other suitable information related to performing the various actions and functions set forth herein. Memory 1008, for instance, can store protocols and/or algorithms associated with monitoring a non-serving base station (e.g., macro cell base station, . . . ), generating feedback related to the non-serving base station, transmitting the feedback related to the non-serving base station to an access point base station that serves UE 1000, and so forth.

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 can be operatively coupled to a monitor component 1010 and/or an adjustment feedback component 1012. Monitor component 1010 can be substantially similar to monitor component 306 of FIG. 3 and/or adjustment feedback component 1012 can be substantially similar to adjustment feedback component 406. Monitor component 1010 can monitor a non-serving base station in a TDD wireless communication environment. For example, monitor component 1010 can detect signal strength of the non-serving base station, a CSG associated with the non-serving base station, timing of the non-serving base station, a TDD configuration implemented by the non-serving base station, and the like. UE 1000 can supply information detected by monitor component 1010 to the access point base station that serves UE 1000. Moreover, adjustment feedback component 1012 can yield a timing adjustment that can be transmitted to the access point base station that serves UE 1000. UE 1000 still further comprises a modulator 1014 and a transmitter 1016 that transmits data, signals, etc. to a base station. Although depicted as being separate from the processor 1006, it is to be appreciated that monitor component 1010, adjustment feedback component 1012 and/or modulator 1014 can be part of processor 1006 or a number of processors (not shown).

Figure 11:
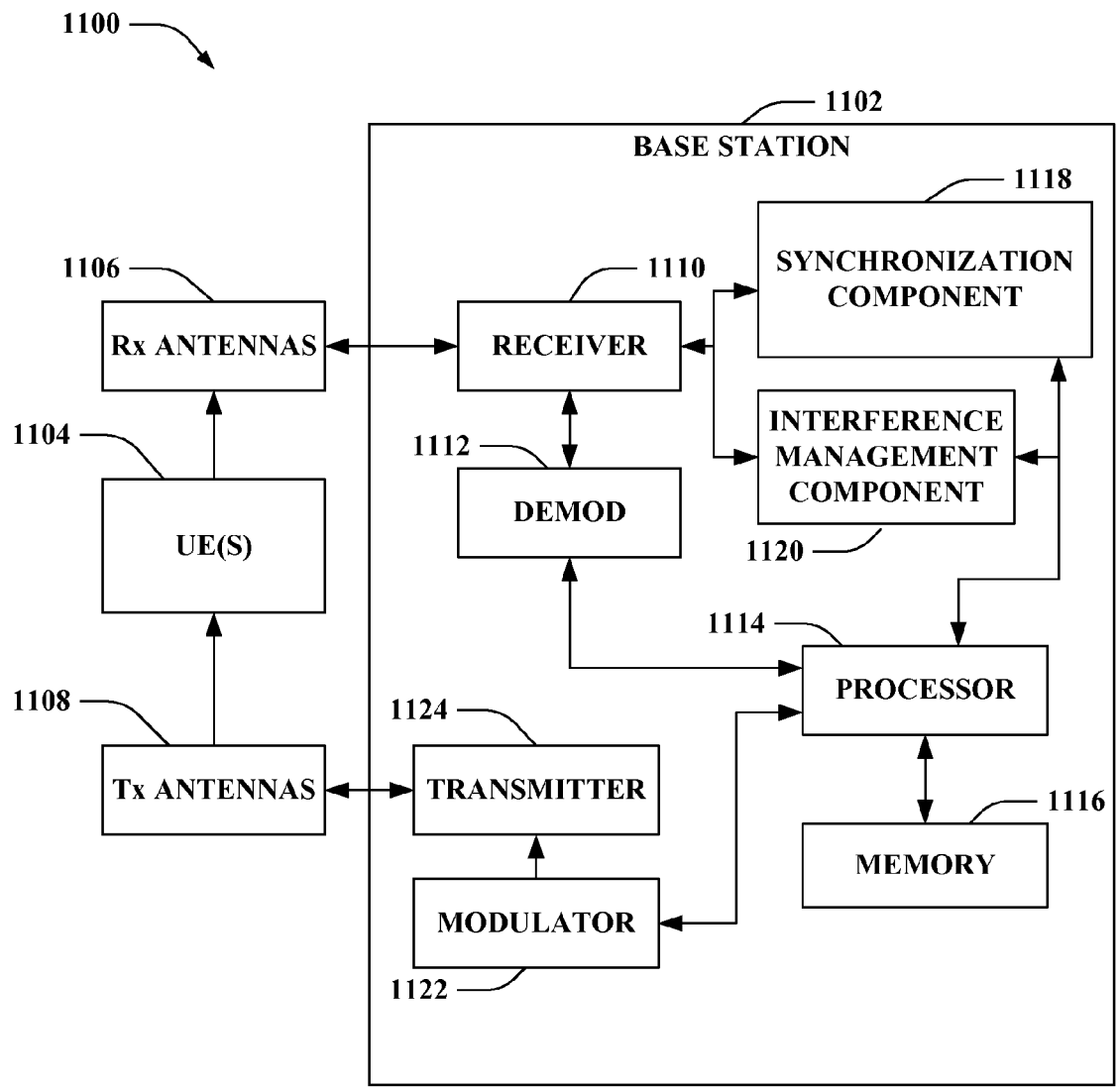
FIG. 11 is an illustration of an example system that establishes synchronization and/or mitigates interference in a wireless communication environment.

FIG. 11 is an illustration of a system 1100 that establishes synchronization and/or mitigates interference in a wireless communication environment. System 1100 comprises a base station 1102 (e.g., access point, . . . ) with a receiver 1110 that receives signal(s) from one or more UEs 1104 through a plurality of receive antennas 1106, and a transmitter 1124 that transmits to the one or more UEs 1104 through a transmit antenna 1108. Moreover, base station 1102 can receive signal(s) with receiver 1110 from one or more disparate base stations through the plurality of receive antennas 1106 and/or transmit to one or more disparate base stations with transmitter 1124 through the transmit antenna 1108. According to another illustration, base station 1102 can receive signal(s) from (e.g., with receiver 1110, . . . ) and/or transmit signal(s) to (e.g., with transmitter 1124, . . . ) one or more disparate base stations via a backhaul. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores data to be transmitted to or received from UE(s) 1104 and/or disparate base station(s) and/or any other suitable information related to performing the various actions and functions set forth herein. Processor 1114 is further coupled to a synchronization component 1118 and/or an interference management component 1120. Synchronization component 1118 can be substantially similar to synchronization component 210 of FIG. 2 and/or interference management component 1120 can be substantially similar to interference management component 212 of FIG. 2. Synchronization component 1118 can synchronize timing of base station 1102 with timing of a disparate base station (not shown). Further, interference management component 1120 can control interference caused by base station 1102. For instance, interference management component 1120 can select a TDD configuration for use by base station 1102. Moreover, although not shown, it is to be appreciated that base station 1102 can further include a timing component (e.g., substantially similar to timing component 214 of FIG. 2, . . . ), a message exchange component (e.g., substantially similar to message exchange component 302 of FIG. 3, . . . ), a monitor component (e.g., substantially similar to monitor component 304 of FIG. 3, . . . ), a power control component (e.g., substantially similar to power control component 402 of FIG. 4, . . . ), a scheduling component (e.g., substantially similar to scheduling component 404 of FIG. 4, . . . ), and/or an offset component (e.g., substantially similar to offset component 502 of FIG. 5, . . . ). Base station 1102 can further include a modulator 1122. Modulator 1122 can multiplex a frame for transmission by a transmitter 1124 through antennas 1108 to UE(s) 1104 in accordance with the aforementioned description. Although depicted as being separate from the processor 1114, it is to be appreciated that synchronization component 1118, interference management component 1120, and/or modulator 1122 can be part of processor 1114 or a number of processors (not shown).

Figure 12:
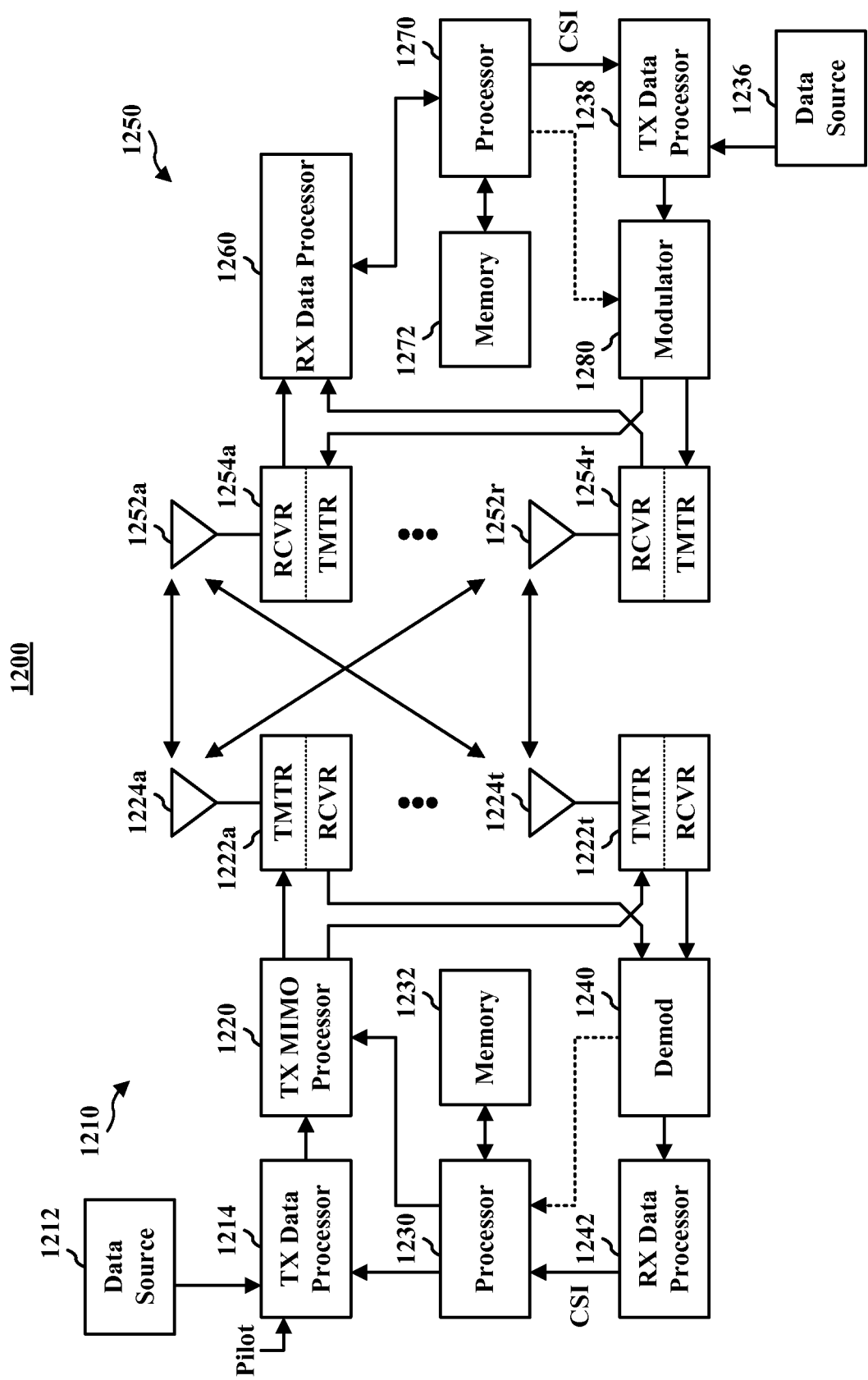
FIG. 12 is an illustration of an example wireless network environment that can be employed in conjunction with the various systems and methods described herein.

FIG. 12 shows an example wireless communication system 1200. The wireless communication system 1200 depicts one base station 1210 and one UE 1250 for sake of brevity. However, it is to be appreciated that system 1200 can include more than one base station and/or more than one UE, wherein additional base stations and/or UEs can be substantially similar or different from example base station 1210 and UE 1250 described below. In addition, it is to be appreciated that base station 1210 and/or UE 1250 can employ the systems (FIGS. 1-6, 10-11 and 13-14) and/or methods (FIGS. 7-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230. Memory 1232 can store program code, data, and other information used by processor 1230 or other components of base station 1210.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At UE 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from UE 1250 are received by antennas 1224, conditioned by receivers 1222, demodulated by a demodulator 1240, and processed by a RX data processor 1242 to extract the reverse link message transmitted by UE 1250. Further, processor 1230 can process the extracted message to determine which precoding matrix to use for determining the beamforming weights.

Processors 1230 and 1270 can direct (e.g., control, coordinate, manage, etc.) operation at base station 1210 and UE 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
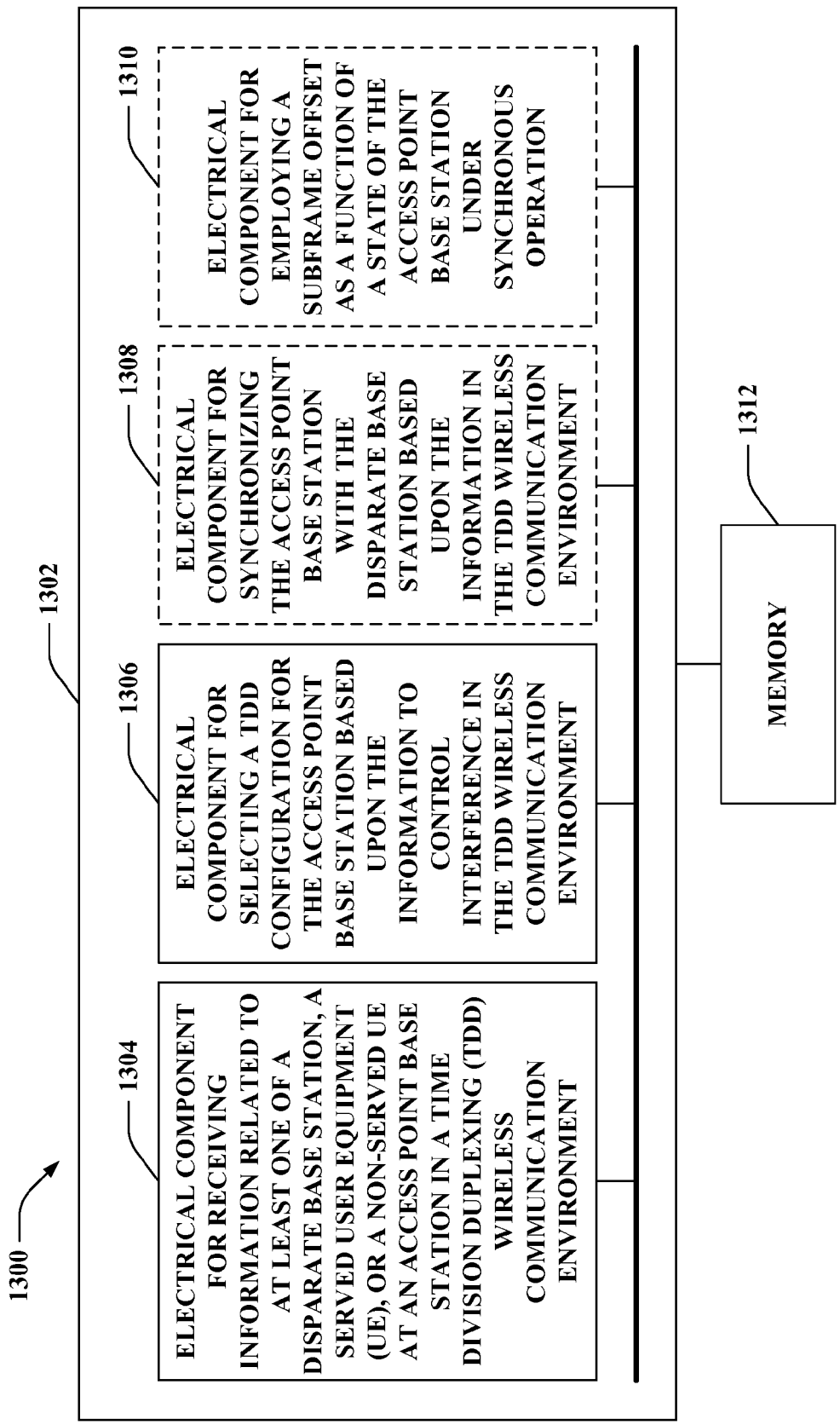
FIG. 13 is an illustration of an example system that enables managing interference in a wireless communication environment.

With reference to FIG. 13, illustrated is a system 1300 that enables managing interference in a wireless communication environment. For example, system 1300 can reside at least partially within a base station. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving information related to at least one of a disparate base station, a served user equipment (UE), or a non-served UE at an access point base station in a time division duplexing (TDD) wireless communication environment 1304. Further, logical grouping 1302 can include an electrical component for selecting a TDD configuration for the access point base station based upon the information to control interference in the TDD wireless communication environment 1306. Moreover, logical grouping 1302 can optionally include an electrical component for synchronizing the access point base station with the disparate base station based upon the information in the TDD wireless communication environment 1308. Logical grouping 1302 can also optionally include an electrical component for employing a subframe offset as a function of a state of the access point base station under synchronous operation 1310. By way of example, the state can be one of idle state or active state. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

Figure 14:
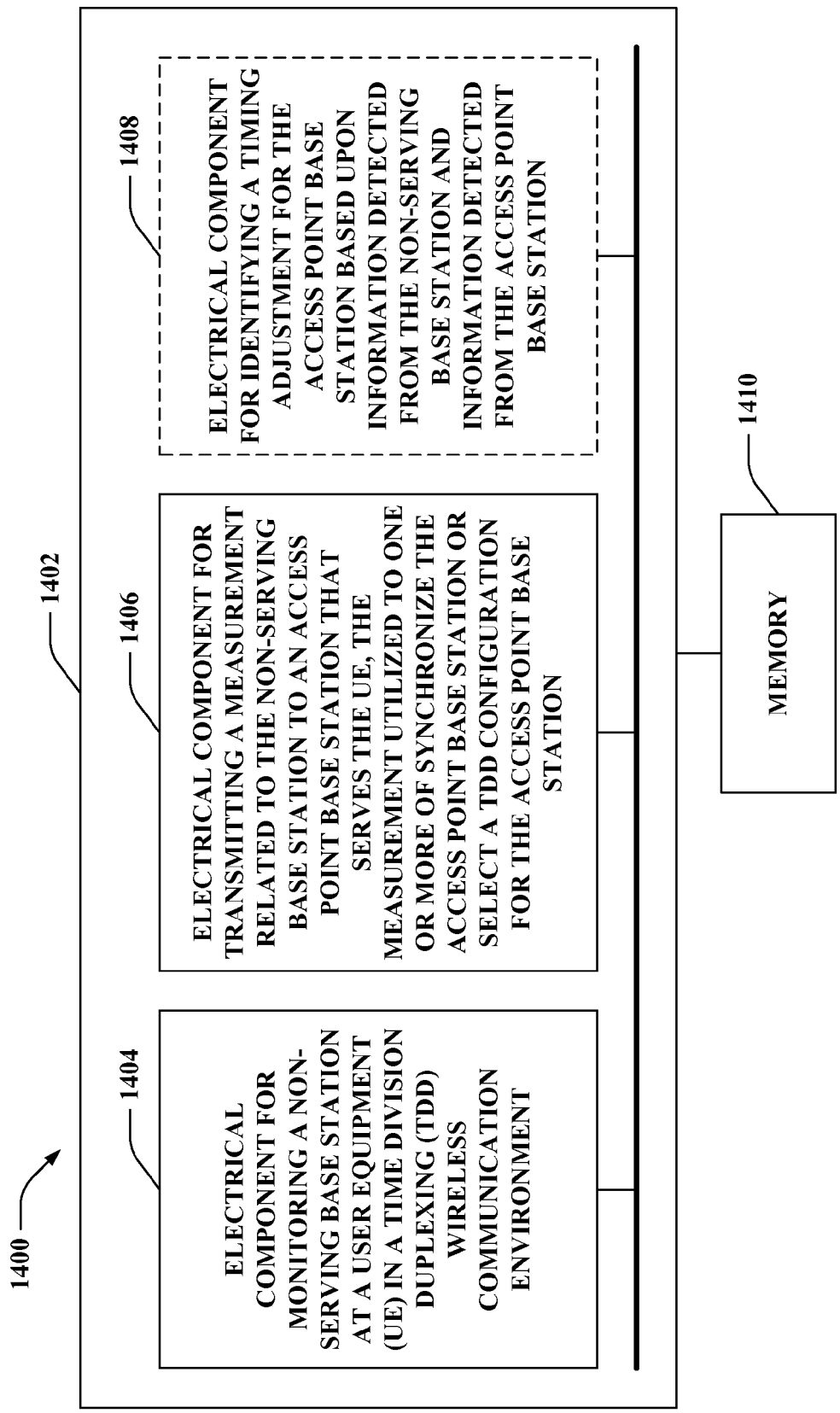
FIG. 14 is an illustration of an example system that enables providing feedback to an access point base station in a wireless communication environment.

With reference to FIG. 14, illustrated is a system 1400 that enables providing feedback to an access point base station in a wireless communication environment. For example, system 1400 can reside within a UE. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for monitoring a non-serving base station at a user equipment (UE) in a time division duplexing (TDD) wireless communication environment 1404. Moreover, logical grouping 1402 can include an electrical component for transmitting a measurement related to the non-serving base station to an access point base station that serves the UE, the measurement utilized to one or more of synchronize the access point base station or select a TDD configuration for the access point base station 1406. Logical grouping 1402 can also optionally include an electrical component for identifying a timing adjustment for the access point base station based upon information detected from the non-serving base station and information detected from the access point base station 1408. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
    receiving information related to at least one of a disparate base station, a served user equipment (UE), or a non-served UE at an access point base station in a time division duplexing (TDD) wireless communication environment;
    selecting a first base station TDD configuration for the access point base station based at least in part upon a second base station TDD configuration for the disparate base station and the information; and
    recognizing asynchronous operation or synchronous operation of the access point base station.

2. The method of claim 1, wherein the information includes messages exchanged over a backhaul.

3. The method of claim 2, wherein the messages exchanged over the backhaul include at least one of a UE measurement of a neighboring cell, a base station measurement of a neighboring cell, a base station measurement of a neighboring UE, configuration information of a base station, or timing information.

4. The method of claim 2, wherein the messages exchanged over the backhaul are received from a Home Evolved Node B (HeNB) management system (HMS).

5. The method of claim 1, wherein the information includes a signal detected from the non-served UE, the signal being at least one of a Sounding Reference Signal (SRS), a Reference Signal (RS), a Physical Uplink Control Channel (PUCCH) transmission, or a Physical Uplink Shared Channel (PUSCH) transmission.

6. The method of claim 1, wherein the asynchronous operation of the access point base station is recognized; and
the first base station TDD configuration selected reduces a downlink cycle at the access point base station to reduce a jamming probability.

7. The method of claim 1, wherein the asynchronous operation of the access point base station is recognized; and
the method further comprising selecting the first base station TDD configuration for the access point base station to coordinate with the second base station TDD configuration utilized by the disparate base station.

8. The method of claim 7, wherein the first base station TDD configuration complements the second base station TDD configuration utilized by the disparate base station to reduce mutual interference.

9. The method of claim 1, wherein the asynchronous operation of the access point base station is recognized; and
the method further comprising implementing a subframe offset as a function of a state of the access point base station.

10. The method of claim 9, further comprising:
utilizing the subframe offset when the access point base station is in idle state; and
inhibiting use of the subframe offset when the access point base station is in active state.

11. The method of claim 10, further comprising removing the subframe offset when the access point base station switches to active state upon access by the served UE.

12. The method of claim 1, further comprising synchronizing the access point base station with the disparate base station based upon the information in the TDD wireless communication environment.

13. The method of claim 12, further comprising adjusting timing of the access point base station based upon the information to synchronize the access point base station.

14. The method of claim 12, further comprising:
detecting a signal from the non-served UE, wherein the signal being at least one of a Sounding Reference Signal (SRS), a Reference Signal (RS), a Physical Uplink Control Channel (PUCCH) transmission, or a Physical Uplink Shared Channel (PUSCH) transmission; and
adjusting timing of the access point base station as a function of the signal.

15. The method of claim 14, further comprising, adjusting a power level as a function of the signal.

16. A method, comprising:
receiving information related to at least one of a disparate base station, a served user equipment (UE), or a non-served UE at an access point base station in a time division duplexing (TDD) wireless communication environment; and
selecting a first base station TDD configuration for the access point base station based at least in part upon a second base station TDD configuration for the disparate base station and the information;
wherein the information includes an advertisement indicating that the disparate base station is a master node.

17. The method of claim 16, further comprising selecting the first base station TDD configuration based on observations of the disparate base station upon receiving the advertisement.

18. A method, comprising:
receiving information related to at least one of a disparate base station, a served user equipment (UE), or a non-served UE at an access point base station in a time division duplexing (TDD) wireless communication environment; and
selecting a first base station TDD configuration for the access point base station based at least in part upon a second base station TDD configuration for the disparate base station and the information;
wherein the information includes a power control command sent by the disparate base station, the power control command being received at least one of over-the-air, via a backhaul, or via tunneling from the served UE.

19. A method, comprising:
receiving information related to at least one of a disparate base station, a served user equipment (UE), or a non-served UE at an access point base station in a time division duplexing (TDD) wireless communication environment;
selecting a first base station TDD configuration for the access point base station based at least in part upon a second base station TDD configuration for the disparate base station and the information; and
implementing a technique with the access point base station to mitigate jamming, the technique comprising at least one of:
transitioning the access point base station to open access mode from closed access mode;
reducing a transmit power level of the access point base station and a transmit power level of the served UE;
reducing a duty cycle of the access point base station; or
selecting a particular base station TDD configuration with fewer subframes on a downlink to reduce downlink jamming.

20. A method, comprising:
receiving information related to at least one of a disparate base station, a served user equipment (UE), or a non-served UE at an access point base station in a time division duplexing (TDD) wireless communication environment;
selecting a first base station TDD configuration for the access point base station based at least in part upon a second base station TDD configuration for the disparate base station and the information;
synchronizing the access point base station with the disparate base station based upon the information in the TDD wireless communication environment;
scheduling wake-up cycles for the served UE as a function of a position of the served UE, wherein the served UE identifies a timing adjustment based upon a timing difference between the access point base station and the disparate base station;
receiving the timing adjustment from the served UE; and
adjusting timing of the access point base station as a function of the timing adjustment received from the served UE.

21. A wireless communications apparatus, comprising:
at least one processor configured to:

receive information related to at least one of a disparate base station, a served user equipment (UE), or a non-served UE at an access point base station in a time division duplexing (TDD) wireless communication environment;
select a first base station TDD configuration for the access point base station based at least in part upon a second base station TDD configuration for the disparate base station and the information; and
recognize asynchronous operation or synchronous operation of the access point base station.

22. The wireless communications apparatus of claim 21, wherein the information includes at least one of messages exchanged over a backhaul, a signal detected from the non-served UE, an advertisement indicating that the disparate base station is a master node, or a power control command send by the disparate base station.

23. The wireless communications apparatus of claim 22, wherein the messages exchanged over the backhaul include at least one of a UE measurement of a neighboring cell, a base station measurement of a neighboring cell, a base station measurement of a neighboring UE, configuration information of a base station, or timing information.

24. The wireless communications apparatus of claim 22, wherein the messages exchanged over the backhaul are received from a Home Evolved Node B (HeNB) management system (HMS).

25. The wireless communications apparatus of claim 21, wherein the at least one processor is further configured to:
recognize asynchronous operation of the access point base station, wherein the first base station TDD configuration selected reduces a downlink cycle at the access point base station to reduce a jamming probability.

26. The wireless communications apparatus of claim 21, wherein the at least one processor is further configured to:
recognize synchronous operation of the access point base station; and
select the first base station TDD configuration of the access point base station to coordinate with the second base station TDD configuration utilized by the disparate base station.

27. The wireless communications apparatus of claim 26, wherein the first base station TDD configuration of the access point base station complements the second base station TDD configuration utilized by the disparate base station to reduce mutual interference.

28. The wireless communications apparatus of claim 26, further comprising:
at least one processor configured to:
implement a subframe offset as a function of a state of the access point base station.

29. The wireless communications apparatus of claim 28, further comprising:
at least one processor configured to:
utilize the subframe offset when the access point base station is in idle state; and
inhibit use of the subframe offset when the access point base station is in active state.

30. The wireless communications apparatus of claim 29, further comprising:
at least one processor configured to: remove the subframe offset when the access point base station switches to active state upon access by the served UE.

31. The wireless communications apparatus of claim 21, wherein the at least one processor is further configured to:
synchronize the access point base station with the disparate base station based upon the information in the TDD wireless communication environment.

32. The wireless communications apparatus of claim 31, wherein the at least one processor is further configured to:
detect a signal from the non-served UE, the signal being at least one of a Sounding Reference Signal (SRS), a Reference Signal (RS), a Physical Uplink Control Channel (PUCCH) transmission, or a Physical Uplink Shared Channel (PUSCH) transmission; and
adjust timing of the access point base station as a function of the signal.

33. The wireless communications apparatus of claim 32, wherein the at least one processor is further configured to:
adjust a power level as a function of the signal.

34. A wireless communications apparatus, comprising:
at least one processor configured to:
receive information related to at least one of a disparate base station, a served user equipment (UE), or a non-served UE at an access point base station in a time division duplexing (TDD) wireless communication environment; and
select a first base station TDD configuration for the access point base station based at least in part upon a second base station TDD configuration for the disparate base station and the information;
wherein the at least one processor is further configured to:
implement at least one of transitioning the access point base station to open access mode from closed access mode, reducing a transmit power level of the access point base station and a transmit power level of the served UE, reducing a duty cycle of the access point base station, or selecting a particular base station TDD configuration with fewer subframes on a downlink to reduce downlink jamming with the access point base station.

35. A wireless communications apparatus, comprising:
at least one processor configured to:
receive information related to at least one of a disparate base station, a served user equipment (UE), or a non-served UE at an access point base station in a time division duplexing (TDD) wireless communication environment; and
select a first base station TDD configuration for the access point base station based at least in part upon a second base station TDD configuration for the disparate base station and the information;
synchronize the access point base station with the disparate base station based upon the information in the TDD wireless communication environment;
schedule wake-up cycles for the served UE as a function of a position of the served UE, wherein the served UE identifies a timing adjustment based upon a timing difference between the access point base station and the disparate base station;
receive the timing adjustment from the served UE; and
adjust timing of the access point base station as a function of the timing adjustment received from the served UE.

36. An apparatus, comprising:
means for receiving information related to at least one of a disparate base station, a served user equipment (UE), or a non-served UE at an access point base station in a time division duplexing (TDD) wireless communication environment; and
means for selecting a first base station TDD configuration for the access point base station based at least in part upon a second base station TDD configuration of the disparate base station and the information; and means for recognizing asynchronous operation or synchronous operation of the access point base station.

37. The apparatus of claim 36, further comprising means for synchronizing the access point base station with the disparate base station based upon the information in the TDD wireless communication environment.

38. The apparatus of claim 36, wherein the information includes at least one of messages exchanged over a backhaul, a signal detected from the non-served UE, an advertisement indicating that the disparate base station is a master node, or a power control command send by the disparate base station.

39. An apparatus, comprising:
means for receiving information related to at least one of a disparate base station, a served user equipment (UE), or a non-served UE at an access point base station in a time division duplexing (TDD) wireless communication environment;
means for selecting a first base station TDD configuration for the access point base station based at least in part upon a second base station TDD configuration of the disparate base station and the information; and
further comprising means for employing a subframe offset as a function of a state of the access point base station under synchronous operation.

40. A computer program product, comprising:
a computer-readable medium comprising:
code for causing at least one computer to receive information related to at least one of a disparate base station, a served user equipment (UE), or a non-served UE at an access point base station in a time division duplexing (TDD) wireless communication environment; and
code for causing at least one computer to select a first base station TDD configuration for the access point base station based at least in part upon a second base station TDD configuration of the disparate base station and the information;
wherein the computer-readable medium further comprising code for recognize asynchronous operation or synchronous operation of the access point base station.

41. The computer program product of claim 40, wherein the computer-readable medium further comprises code for causing at least one computer to synchronize the access point base station with the disparate base station based upon the information in the TDD wireless communication environment.

42. The computer program product of claim 40, wherein the information includes at least one of messages exchanged over a backhaul, a signal detected from the non-served UE, an advertisement indicating that the disparate base station is a master node, or a power control command send by the disparate base station.

43. A computer program product, comprising:
a computer-readable medium comprising:
code for causing at least one computer to receive information related to at least one of a disparate base station, a served user equipment (UE), or a non-served UE at an access point base station in a time division duplexing (TDD) wireless communication environment; and
code for causing at least one computer to select a first base station TDD configuration for the access point base station based at least in part upon a second base station TDD configuration of the disparate base station and the information;
wherein the computer-readable medium further comprises code for causing at least one computer to employ a subframe offset as a function of a state of the access point base station under synchronous operation.

44. An apparatus, comprising:
a timing component that maintains timing for an access point base station;
a synchronization component that implements network listening at the access point base station to self-synchronize the access point base station with a disparate base station by adjusting the timing maintained by the timing component; and
an interference management component that selects a first base station time division duplexing (TDD) configuration for use by the access point base station based at least in part upon a second base station TDD configuration of the disparate base station and the information;
wherein the interference management component further recognizes asynchronous operation or synchronous operation of the access point base station.

45. A method, comprising:
monitoring a non-serving base station at a user equipment (UE) in a time division duplexing (TDD) wireless communication environment; and
transmitting a measurement related to the non-serving base station to an access point base station that serves the UE, the measurement utilized to one or more of synchronize the access point base station or select a first base station TDD configuration for the access point base station based at least in part upon a second base station TDD configuration of the non-serving base station;
wherein the measurement includes information relating to a power control command received from the non-serving base station.

46. The method of claim 45, monitoring the non-serving base station further comprises measuring at least one of a signal strength of the non-serving base station, a closed subscriber group associated with the non-serving base station, a timing of the non-serving base station, or the second base station TDD configuration of the non-serving base station.

47. The method of claim 45, further comprising tunneling the power control command to the access point base station upon being received from the non-serving base station.

48. The method of claim 45, further comprising utilizing beam steering by the UE to mitigate interference to the non-serving base station.

49. A method, comprising:
monitoring a non-serving base station at a user equipment (UE) in a time division duplexing (TDD) wireless communication environment; and
transmitting a measurement related to the non-serving base station to an access point base station that serves the UE, the measurement utilized to one or more of synchronize the access point base station or select a first base station TDD configuration for the access point base station based at least in part upon a second base station TDD configuration of the non-serving base station;
wherein the measurement is a timing adjustment based upon a measured timing difference between the non-serving base station and the access point base station.

50. A wireless communications apparatus, comprising:
at least one processor configured to:
monitor a non-serving base station at a user equipment (UE) in a time division duplexing (TDD) wireless communication environment; and
transmit a measurement related to the non-serving base station to an access point base station that serves the UE, the measurement utilized to one or more of synchronize the access point base station or select a first base station TDD configuration for the access point base station based at least in part upon a second base station TDD configuration of the non-serving base station;
wherein the measurement includes information relating to a power control command received from the non-serving base station.

51. The wireless communications apparatus of claim 50, wherein the at least one processor is further configured to:
measure at least one of a signal strength of the non-serving base station, a closed subscriber group associated with the non-serving base station, a timing of the non-serving base station, or the second TDD configuration of the non-serving base station.

52. The wireless communications apparatus of claim 50, wherein the at least one processor is further configured to:
tunnel the power control command to the access point base station upon being received from the non-serving base station.

53. The wireless communications apparatus of claim 50, wherein the at least one processor is further configured to:
utilize beam steering by the UE to mitigate interference to the non-serving base station.

54. A wireless communications apparatus, comprising:
at least one processor configured to:
monitor a non-serving base station at a user equipment (UE) in a time division duplexing (TDD) wireless communication environment; and
transmit a measurement related to the non-serving base station to an access point base station that serves the UE, the measurement utilized to one or more of synchronize the access point base station or select a first base station TDD configuration for the access point base station based at least in part upon a second base station TDD configuration of the non-serving base station;
wherein the measurement is a timing adjustment based upon a measured timing difference between the non-serving base station and the access point base station.

55. An apparatus, comprising:
means for monitoring a non-serving base station at a user equipment (UE) in a time division duplexing (TDD) wireless communication environment; and
means for transmitting a measurement related to the non-serving base station to an access point base station that serves the UE, the measurement utilized to one or more of synchronize the access point base station or select a first base station TDD configuration for the access point base station based at least in part upon a second base station TDD configuration of the non-serving base station;
wherein the measurement includes information relating to a power control command received from the non-serving base station.

56. The apparatus of claim 55, further comprising means for identifying a timing adjustment for the access point base station based upon information detected from the non-serving base station and information detected from the access point base station.

57. The apparatus of claim 55, wherein the UE beam steers to mitigate interference.

58. A computer program product, comprising:
a computer-readable medium comprising:
code for causing at least one computer to monitor a non-serving base station at a user equipment (UE) in a time division duplexing (TDD) wireless communication environment; and
code for causing at least one computer to transmit a measurement related to the non-serving base station to an access point base station that serves the UE, the measurement utilized to one or more of synchronize the access point base station or select a first base station TDD configuration for the access point base station based at least in part upon a second base station TDD configuration of the non-serving base station; and code for causing at least one computer to identify a timing adjustment for the access point base station based upon information detected from the non-serving base station and information detected from the access point base station.

59. An apparatus, comprising:
a monitor component that detects a timing difference between an access point base station that serves a user equipment (UE) and a disparate base station in a time division duplexing (TDD) wireless communication environment;
an adjustment feedback component that identifies a timing adjustment for the access point base station based upon the timing difference and sends the timing adjustment to the access point base station; and
a cell site modem (CSM) component leveraged by the UE to differentiate between a signal sent by a differing UE over an uplink and a downlink waveform sent by the disparate base station, the CSM component detects when an uplink transmission from the differing UE jams a downlink for the UE and power controls the differing UE.

* * * * *